(12) United States Patent
Wen et al.

(10) Patent No.: US 11,573,661 B2
(45) Date of Patent: Feb. 7, 2023

(54) ELECTRONIC DEVICE HAVING A PIEZOELECTRIC BODY FOR FRICTION HAPTICS

(71) Applicant: Apple Inc., Cupertino, CA (US)

(72) Inventors: Xiaonan Wen, San Jose, CA (US); James E. Pedder, Thame (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/011,806

(22) Filed: Sep. 3, 2020

(65) Prior Publication Data

US 2020/0401228 A1     Dec. 24, 2020

Related U.S. Application Data

(62) Division of application No. 15/717,682, filed on Sep. 27, 2017, now Pat. No. 10,775,890.

(51) Int. Cl.
| | |
|---|---|
| *G06F 3/041* | (2006.01) |
| *G06F 3/01* | (2006.01) |
| *G06F 3/044* | (2006.01) |
| *G06F 3/147* | (2006.01) |
| *G06V 40/13* | (2022.01) |

(52) U.S. Cl.
CPC .......... *G06F 3/04166* (2019.05); *G06F 3/016* (2013.01); *G06F 3/044* (2013.01); *G06F 3/0416* (2013.01); *G06F 3/0443* (2019.05); *G06F 3/0445* (2019.05); *G06F 3/0446* (2019.05); *G06F 3/0412* (2013.01); *G06F 3/147* (2013.01); *G06F 2203/04103* (2013.01); *G06F 2203/04105* (2013.01); *G06V 40/1306* (2022.01)

(58) Field of Classification Search
None
See application file for complete search history.

(56) References Cited

U.S. PATENT DOCUMENTS

| | | |
|---|---|---|
| 5,060,527 A | 10/1991 | Burgess |
| 5,912,533 A | 6/1999 | Lee et al. |
| 6,963,762 B2 | 11/2005 | Kaaresoja et al. |
| 7,148,623 B2 | 12/2006 | Vlaskin |
| 8,026,987 B2 | 9/2011 | Choo et al. |
| 8,174,372 B2 | 5/2012 | da Costa |
| 8,314,775 B2 | 11/2012 | Westerman |
| 8,416,209 B2 | 4/2013 | Hotelling et al. |
| 8,441,465 B2 | 5/2013 | Radivojevic |
| 8,466,366 B2 | 6/2013 | Srinivas |
| 8,766,933 B2 | 7/2014 | Makinen et al. |
| 9,063,572 B2 | 6/2015 | Makinen et al. |
| 9,098,113 B2 | 8/2015 | Brokken |
| 9,122,330 B2 | 9/2015 | Olivier et al. |
| 9,231,186 B2 | 1/2016 | Busgen |

(Continued)

FOREIGN PATENT DOCUMENTS

EP      2000885      12/2008

*Primary Examiner* — Chad M Dicke
(74) *Attorney, Agent, or Firm* — Brownstein Hyatt Farber Schreck, LLP

(57) ABSTRACT

An electronic device is disclosed which includes a conductive layer for providing haptic feedback at an input surface of the electronic device. The conductive layer includes conductive particles within an organic compound, such as an epoxy. When the conductive layer is activated it may provide frictional or other tactile feedback at the input surface.

19 Claims, 16 Drawing Sheets

(56) References Cited

U.S. PATENT DOCUMENTS

| | | |
|---|---|---|
| 9,395,851 B2 | 7/2016 | Mikladal et al. |
| 9,448,713 B2 | 9/2016 | Cruz-Hernandez et al. |
| 9,579,690 B2 | 2/2017 | Beecher et al. |
| 9,600,070 B2 | 3/2017 | Chatterjee et al. |
| 9,612,674 B2 | 4/2017 | Degner et al. |
| 9,634,225 B2 | 4/2017 | Hubert et al. |
| 9,733,746 B2 | 8/2017 | Colgate et al. |
| 9,746,964 B2 | 8/2017 | Rosenberg |
| 9,829,979 B2 | 11/2017 | Brombach et al. |
| 9,875,625 B2 | 1/2018 | Khoshkava et al. |
| 9,880,623 B2 | 1/2018 | Lacroix et al. |
| 9,904,428 B2 | 2/2018 | Schardt |
| 9,927,887 B2 | 3/2018 | Bulea |
| 9,939,900 B2 | 4/2018 | Cruz-Hernandez et al. |
| 9,965,037 B2 | 5/2018 | Hong et al. |
| 9,985,195 B2 | 5/2018 | Mori |
| 10,000,622 B2 | 6/2018 | Kumano et al. |
| 10,031,582 B2 | 7/2018 | Modarres et al. |
| 10,038,154 B2 | 7/2018 | Lee |
| 10,042,468 B2 | 8/2018 | Kim et al. |
| 10,061,448 B2 | 8/2018 | Baek |
| 10,120,447 B2 | 11/2018 | Peshkin et al. |
| 10,147,868 B2 | 12/2018 | Ozawa |
| 10,208,158 B2 | 2/2019 | Banister et al. |
| 10,209,811 B2 | 2/2019 | Kim et al. |
| 10,248,211 B1 | 4/2019 | Van Ausdall et al. |
| 10,257,929 B2 | 4/2019 | Lim |
| 10,318,091 B2 | 6/2019 | Lee et al. |
| 10,331,211 B2 | 6/2019 | Lim et al. |
| 10,379,616 B2 | 8/2019 | Peshkin et al. |
| 10,379,655 B2 | 8/2019 | Colgate |
| 10,381,143 B2 | 8/2019 | Khoshkava et al. |
| 10,394,328 B2 | 8/2019 | Kang et al. |
| 10,416,768 B2 | 9/2019 | Khoshkava et al. |
| 10,416,772 B2 | 9/2019 | Sen et al. |
| 10,423,228 B2 | 9/2019 | Cherif et al. |
| 10,474,279 B2 | 11/2019 | Hwang et al. |
| 10,509,475 B2 | 12/2019 | Van Ausdall et al. |
| 10,585,482 B2 | 3/2020 | Wen et al. |
| 10,650,167 B2 | 5/2020 | Rizzo et al. |
| 10,775,890 B2 | 9/2020 | Wen et al. |
| 2004/0061691 A1 | 4/2004 | Gruber et al. |
| 2007/0236450 A1* | 10/2007 | Colgate .................. G06F 3/045 345/156 |
| 2008/0303795 A1 | 12/2008 | Lowles et al. |
| 2009/0135159 A1* | 5/2009 | Sun ....................... G06F 3/0412 345/174 |
| 2010/0097323 A1 | 4/2010 | Edwards et al. |
| 2011/0074733 A1 | 3/2011 | Makinen |
| 2011/0316802 A1* | 12/2011 | Choi ..................... G06F 3/041 345/173 |
| 2012/0112894 A1 | 5/2012 | Yang et al. |
| 2012/0126959 A1 | 5/2012 | Zarrabi et al. |
| 2012/0306790 A1 | 12/2012 | Kyung et al. |
| 2012/0327006 A1* | 12/2012 | Israr ..................... G06F 3/016 345/173 |
| 2013/0063394 A1* | 3/2013 | Wakuda ................ G06F 3/0446 345/174 |
| 2013/0277625 A1 | 10/2013 | Srinivas et al. |
| 2014/0118277 A1* | 5/2014 | Kim ..................... G06F 3/0412 345/173 |
| 2014/0192005 A1 | 7/2014 | Wakuda et al. |
| 2016/0124548 A1 | 5/2016 | Cherif et al. |
| 2016/0195994 A1* | 7/2016 | Kitada .................. G06F 3/0446 345/174 |
| 2016/0209958 A1 | 7/2016 | Choi et al. |
| 2016/0253040 A1 | 9/2016 | Lee et al. |
| 2016/0357342 A1 | 12/2016 | Olley et al. |
| 2016/0363998 A1 | 12/2016 | Colgate et al. |
| 2016/0370862 A1 | 12/2016 | Colgate et al. |
| 2017/0038904 A1 | 2/2017 | Murata |
| 2017/0239130 A1 | 8/2017 | Rizzo |
| 2017/0262099 A1* | 9/2017 | Nathan ................ G06F 3/0446 |
| 2017/0308171 A1 | 10/2017 | Kamata et al. |
| 2017/0364158 A1 | 12/2017 | Wen et al. |
| 2017/0364184 A1 | 12/2017 | Weinerth et al. |
| 2017/0371490 A1 | 12/2017 | Sugimoto et al. |
| 2018/0081441 A1 | 3/2018 | Pedder et al. |
| 2018/0196548 A1 | 7/2018 | Kim et al. |
| 2018/0269807 A1 | 9/2018 | Khoshkava |
| 2018/0312392 A1 | 11/2018 | Buchanan et al. |
| 2018/0335659 A1 | 11/2018 | Takeda et al. |
| 2018/0364864 A9 | 12/2018 | Olley et al. |
| 2019/0138140 A1 | 5/2019 | Akabane et al. |
| 2019/0138702 A1 | 5/2019 | Pan |
| 2020/0117278 A1 | 4/2020 | Van Ausdall et al. |
| 2020/0159331 A1 | 5/2020 | Wen et al. |

* cited by examiner

ELECTRONIC DEVICE HAVING A PIEZOELECTRIC BODY FOR FRICTION HAPTICS

CROSS-REFERENCE TO RELATED APPLICATION

This application is a division of U.S. Nonprovisional patent application Ser. No. 15/717,682, filed Sep. 27, 2017, the contents of which are incorporated herein by reference as if fully disclosed herein.

FIELD

The described embodiments relate generally to an electronic device which provides haptic output. More particularly, the present embodiments relate to providing electrostatic haptic output through coating a surface of an electronic device with a conductive coating and a passivation coating over the conductive coating.

BACKGROUND

Many electronic devices provide feedback to a user through various stimuli, such as visual representations, audible sound, and tactile responses. Feedback from an electronic device may enhance user experience in interacting with the electronic device. For example, entry of inputs may be confirmed to a user through a visual alert, through a particular sound, and so on.

Electronic devices may also provide tactile feedback to a user. As an example, a mechanical button may provide feedback through the actions of a spring, collapsible dome, or similar resistive component. In other devices, vibratory feedback may be provided to a user in contact with the electronic device, such as through an actuating haptic motor.

SUMMARY

Embodiments described herein relate to an electronic device providing electrostatic haptic feedback at an input surface of the electronic device. The electronic device may include a cover with an input surface, which may include a rigid transparent sheet. An electrostatic conductive layer may be disposed over the transparent sheet, and a passivation layer may be placed over the electrostatic conductive layer to form the input surface. A part of the electrostatic conductive layer may be activated through an electric field to provide friction feedback at the input surface.

In an example embodiment, an electronic device includes a housing forming an external surface of the electronic device. A cover assembly is coupled to the housing and defines an input surface. The cover assembly includes a cover sheet layer, a touch sensor layer coupled to the cover sheet layer and configured to detect a touch on the input surface, and an electrostatic conductive layer coupled to the cover sheet layer. The electronic device also includes processing circuitry configured to drive the touch sensor layer, causing at least a portion of the electrostatic conductive layer to experience an electric field. In response to the electric field, the electrostatic conductive layer causes variable friction feedback at the input surface.

In some cases, the processing circuitry drives the touch sensor layer, causing a region of the electrostatic conductive layer corresponding to a location of the touch to experience the electric field. A display may be positioned below the cover assembly and configured to visually indicate a feedback region. The electrostatic conductive layer causes variable friction feedback at a region of the input surface corresponding to the feedback region.

In another example embodiment, an electronic device includes a housing, a display at least partially enclosed by the housing, and a transparent cover assembly coupled to the housing and positioned over the display. The transparent cover assembly includes a cover sheet layer and a drive touch electrode and a sense touch electrode coupled to and positioned below the cover sheet layer. The drive touch electrode and the sense touch electrode operate to detect a location of a touch on the external surface.

An electrostatic conductive layer is coupled to and positioned above the cover sheet layer. The electrostatic conductive layer includes conductive particles in an organic matrix. The passivation layer includes a dielectric material and forms an external surface of the electronic device. The electrostatic conductive layer is configured to increase friction between a finger and the external surface in response to the drive touch electrode receiving a drive signal. A passivation layer is coupled to and positioned above the electrostatic conductive layer.

In some examples, the electrostatic conductive layer also includes non-conductive particles, and the conductive particles are formed into a conductive region corresponding to the drive touch electrode surrounded by non-conductive particles. The organic matrix may include an epoxy and the conductive particles may include at least one of indium tin oxide, tin oxide, aluminum zinc oxide, indium zinc oxide, or a transparent conductive oxide.

In another example embodiment, a method is provided for forming a cover assembly for an electronic device to provide electrostatic feedback on an input surface. The method includes the operations of forming an organic compound and distributing conductive particles within the organic compound. The organic compound is deposited over a cover sheet formed from a rigid transparent material. The organic compound is cured, and a dielectric layer is deposited over the organic compound. The method also includes coupling a touch sensor to the cover sheet.

BRIEF DESCRIPTION OF THE DRAWINGS

The disclosure will be readily understood by the following detailed description in conjunction with the accompanying drawings, wherein like reference numerals designate like elements.

Figure 1:
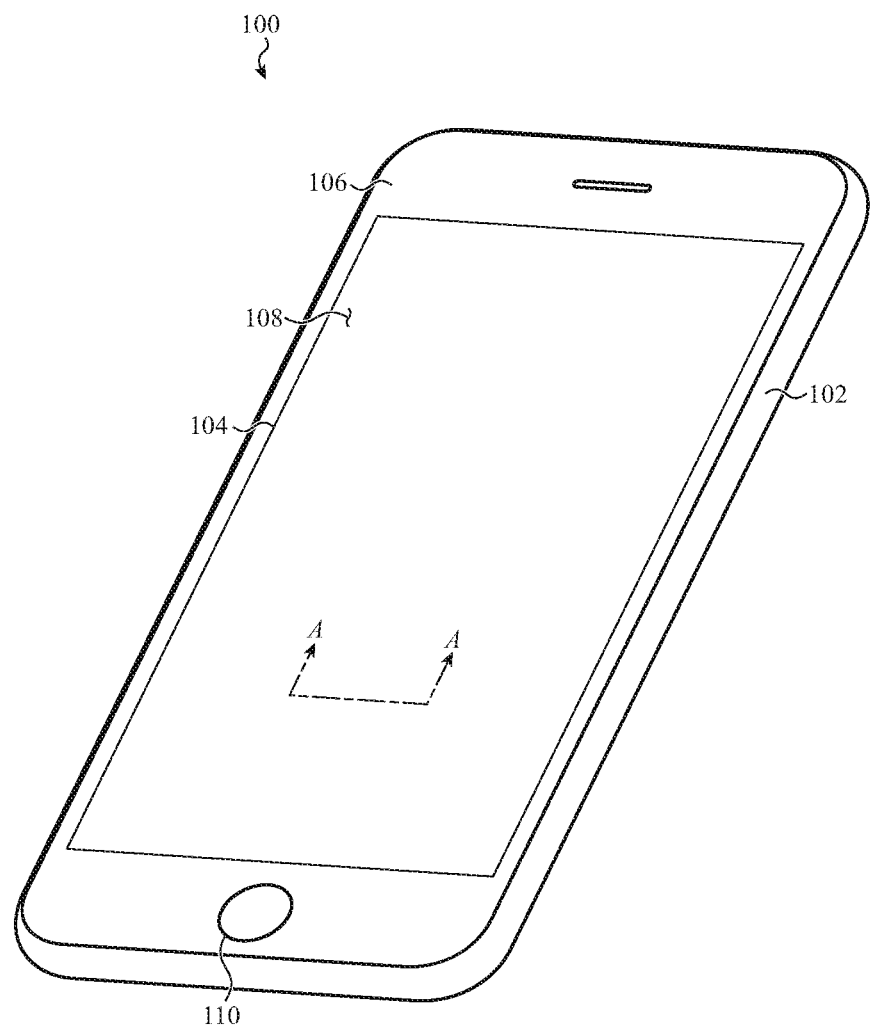
FIG. 1 depicts an electronic device incorporating a hybrid conductive coating for electrostatic haptic feedback according to the present disclosure.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The following disclosure relates to an electronic device which provides electrostatic haptic feedback over an input surface of the electronic device. The electrostatic haptic feedback may provide tactile sensations to a user in contact with the input surface, such as changes in friction. The electronic device may include a hybrid conductive coating, which may include inorganic conductive and non-conductive particles within an organic matrix. The hybrid conductive coating may include an electrostatic conductive layer, and the device may be configured to apply an electrostatic charge to an input surface or other exterior surface of the device through the electrostatic conductive layer.

The electrostatic charge may alter or modify a tactile or touch-based stimulus that is perceived by a user. In some cases, the tactile feedback may cause an increased (or decreased) friction or surface roughness between an object (e.g., the user's finger) and the exterior/input surface as the object is moved along the input surface, for example by electrostatically attracting the user's finger to the input surface.

The input surface may include an electrostatic conductive layer below a passivation layer. Electrostatic haptic feedback may be provided by an electric field interacting with the electrostatic conductive layer to produce an attractive force between the electrostatic conductive layer and an object (e.g., the user's finger). The passivation layer may be a dielectric layer, sealing the electrostatic conductive layer from moisture and the external environment while providing an electrically insulating surface between the electrostatic conductive layer and the user's finger.

Additional components, such as touch sensors, may be placed below the electrostatic conductive layer. In order to provide haptic feedback to an input surface, the electrostatic conductive layer may have a low resistance level relative to the passivation layer. In some embodiments, it may also be desirable to avoid the electrostatic conductive layer interfering with or blocking performance of other sensors, such as capacitive touch sensor below the electrostatic conductive layer.

Accordingly, the electrostatic conductive layer may be formed with conductive particles within a non-conductive substrate. The non-conductive substrate may be an organic compound or matrix, such as an epoxy. For example, conductive particles may be dispersed within an organic epoxy, and the epoxy may be deposited over a cover sheet layer and cured. In some embodiments, the conductive particles may be patterned over the cover sheet layer, or the conductive particles may be dispersed.

A drive electrode may be positioned below the electrostatic conductive layer. All or a portion of the conductive layer may be activated by driving the drive electrode with an electrical signal. Driving the drive electrode may cause an electric field to be generated, which may induce an attractive force in the conductive particles of at least a portion of the electrostatic conductive layer.

In some embodiments, the conductive particles nearest the drive electrode may become electrically coupled to the drive electrode, which may localize the haptic feedback produced. In some embodiments, the electrostatic feedback may not be localized. The drive electrode may be one of a set or array of drive electrodes. In some embodiments, the drive electrode may also be a drive electrode of a capacitive touch sensor.

A particular embodiment of the input device may be a portable electronic device, such as a mobile telephone or tablet. The electronic device may include a cover assembly coupled to a housing, with the cover assembly defining an input surface. The cover assembly may be transparent and enclose a display.

The cover assembly includes a cover sheet layer and a conductive layer deposited on the cover sheet layer. The conductive layer may provide a variable or configurable friction feedback to the input surface. A passivation layer may be deposited over the conductive layer, which may be a dielectric layer between the conductive layer and a finger or other object in contact with the passivation layer. A touch sensor may be disposed below the cover sheet layer to detect the presence and/or location of an object on the input surface of the cover assembly.

The touch sensor may include drive touch electrodes and sense touch electrodes, which may be arranged in a pattern. In some embodiments, the drive touch electrodes may be formed as linear electrodes formed in rows, and the sense touch electrodes may be formed as linear electrodes in columns. A substrate may separate the drive touch electrodes and the sense touch electrodes. The drive touch electrodes and/or sense touch electrodes may be monitored for changes in capacitance indicating a touch on the input surface.

Additionally, the drive touch electrodes may be driven with a haptic drive signal in order to provide the electrical field to activate the conductive layer and provide electrostatic haptic feedback at the input surface. The haptic drive signal may induce a variable electrostatic charge on the surface, which may produce sensations of higher and/or lower friction to a user operating the electronic device.

In some cases, an electronic device may incorporate a piezoelectric body that can be used as a haptic output element. The piezoelectric body may also serve as a dielectric layer separating sensing electrodes of a capacitive touch sensor, providing a single component to detect input and provide haptic output. In such examples, a ground electrode of the piezoelectric body can be used as a ground electrode of the capacitive touch sensor.

As a result of these constructions, an input/output interface can be manufactured to smaller dimensions, with fewer parts and materials, at increased speed, and reduced cost. It may be appreciated that any embodiment described herein—or any alternative thereto, or modification thereof—can incorporate one or more input sensors that share one or more elements, electrodes, components, or layers with a haptic output element.

Further, in some embodiments, a haptic output element of the cover assembly is configured to receive a voltage that is substantially higher than a system voltage or reference voltage of the electronic device. For example, a haptic output element may be configured to drive an electrostatic conductive layer positioned below the input surface with a high voltage signal in order to increase perceived friction between the user's finger and the interface surface via electroadhesion. In another example, a haptic output element may be configured to apply a high voltage signal to a piezoelectric body in order to mechanically agitate the interface surface (in-plane or out-of-plane) nearby the user's finger.

These and other embodiments are discussed below with reference to FIGS. 1-11. However, those skilled in the art will readily appreciate that the detailed description given herein with respect to these figures is for explanatory purposes only and should not be construed as limiting.

FIG. 1 depicts an electronic device incorporating a hybrid conductive coating for electrostatic haptic feedback according to the present disclosure. In the illustrated embodiment, the electronic device 100 is implemented as a portable electronic device, such as a mobile phone. Other embodiments can implement the electronic device differently. For example, an electronic device can be a tablet computing device, a laptop computer, a wearable computing device, a digital music player, a kiosk, a stand-alone touch screen display, a mouse, a keyboard, and other types of electronic devices that provide electrostatic haptic feedback at an external surface of the electronic device 100.

The electronic device 100 includes a housing 102 at least partially surrounding a display 104. The housing 102 can form an external surface or partial external surface for the internal components of the electronic device 100. The housing 102 can be formed of one or more components operably connected together, such as a front piece and a back piece. Alternatively, the housing 102 can be formed of a single piece operably connected to the display 104.

The display 104 can provide a visual output to the user. The display 104 can be implemented with any suitable technology, including, but not limited to, a liquid crystal display element, a light emitting diode element, an organic light-emitting display element, an organic electroluminescence element, and the like. A cover assembly 106 may be positioned over the display 104 and define an input surface 108 external to the electronic device 100.

A cover assembly 106 may be positioned over the front surface (or a portion of the front surface) of the electronic device 100. At least a portion of the cover assembly may function as an input surface 108 that receives touch and/or force inputs. In some embodiments, touch and/or force inputs can be received across other portions of the cover assembly 106 and/or portions of the housing 102. The cover assembly 106 may include various layers and components, including a cover sheet layer formed of a suitable material, such as glass, plastic, sapphire, or combinations thereof. Example cross-sections of the layers of the cover assembly 106 are described with respect to FIGS. 3-5.

The cover assembly 106 may additionally include a touch sensor for detecting the presence and/or the location of one or more touches on the input surface 108 of the electronic device 100. In many examples, the touch sensor is a capacitive touch sensor configured to detect the location and/or area of one or more touches of a user's finger and/or a passive or active stylus on the input surface 108.

The cover assembly 106 may include a force sensor configured to detect a location and/or amount of force applied to the input surface 108. The force sensor may be operably connected to force-sensing circuitry configured to estimate an amount of applied force. The force-sensing circuitry may output a signal or otherwise indicate an input in response to estimating an amount of force exceeding a threshold. The threshold amount may be fixed or variable, and more than one threshold may be provided corresponding to different inputs.

In a particular embodiment, the cover assembly 106 may also include a hybrid conductive coating, which may include inorganic conductive and non-conductive particles within an organic matrix. The hybrid conductive coating may include one or more layers for providing electrostatic haptic feedback at the input surface 108 of the electronic device 100. The hybrid conductive coating of the cover assembly 106 may include an electrostatic conductive layer, which may be below a dielectric passivation layer. When activated, the electrostatic conductive layer may produce an electrostatic charge on the input surface 108, which may produce tactile feedback to a user in the form of modified friction (e.g., variable friction feedback) as the user moves a finger across the input surface 108 where electrodes are active. Example operations of electrostatic haptic feedback are described below with respect to FIGS. 2A-2E.

The electrostatic conductive layer may include conductive particles within a substrate, such as an organic matrix or compound. In some examples, the conductive particles may be arranged in a pattern, such as described below with respect to FIGS. 8A-8C. The conductive particles may be individually controllable such that at a given time the level of friction may vary at multiple locations across the input surface 108, such as described below with respect to FIGS. 9A-9C. An example method for forming electrostatic feedback layers within the cover assembly 106 is described below with respect to FIG. 10.

In some examples, friction or other haptic feedback may be provided through a piezoelectric body, such as a piezoelectric substrate. A piezoelectric haptic output can, in some examples, be a localized decrease in perceived friction between the user's finger and the interface surface. In some examples, the piezoelectric body may also provide an insulating substrate for an input sensor, such as a touch sensor. Examples of an electronic device 100 incorporating a piezoelectric body for haptic output are further described below with respect to FIGS. 6A-7B.

Various layers of the cover assembly 106 and/or the display 104 (such as the cover sheet, display 104, touch sensor layer, force sensor layer, and so on) may be adhered together with an optically transparent adhesive and/or may be supported by a common frame or portion of the housing 102. A common frame may extend around a perimeter, or a portion of the perimeter, of the display 104 and/or the cover assembly 106. The common frame may be segmented around the perimeter, a portion of the perimeter, or may be coupled to the display 104 and/or the cover assembly 106 in another manner.

The common frame can be made from any suitable material such as, but not limited to: metal, plastic, ceramic, acrylic, and so on. The common frame, in some embodiments, may be a multi-purpose component serving an additional function such as, but not limited to: providing an environmental and/or hermetic seal to one or more components of the display 104, the cover assembly 106, or the electronic device 100; providing structural support to the housing 102; providing pressure relief to one or more components of the display 104, the cover assembly 106, or the electronic device 100; providing and defining gaps between one or more layers of the display 104 and/or the cover assembly 106 for thermal venting and/or to permit flexing of the layers in response to a force applied to the input surface 108; and so on.

In some embodiments, each of the layers of the display stack may be attached or deposited onto separate substrates that may be laminated or bonded to each other. The display stack may also include other layers for improving the structural or optical performance of the display 104, including, for example, polarizer sheets, color masks, and the like. Additionally, the display stack may include a touch and/or force sensor layer for receiving inputs on the input surface 108 of the electronic device 100.

In many cases, the electronic device 100 can also include a processor, memory, power supply and/or battery, network connections, sensors, input/output ports, acoustic components, haptic components, digital and/or analog circuits for performing and/or coordinating tasks of the electronic device 100, and so on. For simplicity of illustration, the electronic device 100 is depicted in FIG. 1 without many of these components, each of which may be included, partially and/or entirely, within the housing 102. Examples of such components are described below with respect to FIG. 11.

The electronic device 100 may also include one or more input devices 110, which may be coupled to the housing 102 and/or the cover assembly 106. The input device 110 may be a mechanical button, a soft button (e.g., a button that does not physically move but still accepts inputs), an icon or image on a display, and so on. The input device 110 may receive touch inputs and/or force inputs. In some embodiments, the input device 110 may additionally or alternatively be operable to receive biometric data from a user, such as through a capacitive fingerprint sensor, or another biometric sensor implemented with ultrasonic, infrared, multi-spectral, RF, thermal, optical, resistance, piezoelectric, and other technologies.

Figure 2A:
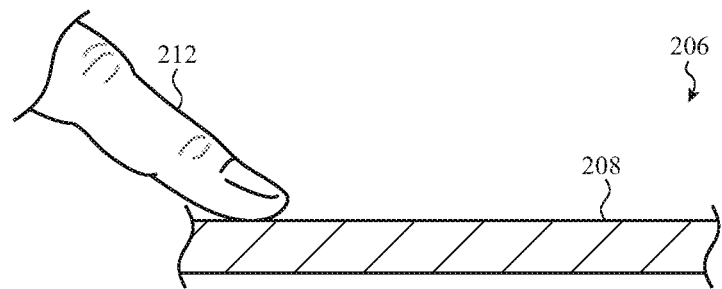
FIG. 2A depicts a cross-section of a cover assembly, taken along section A-A of FIG. 1, illustrating providing electrostatic haptic feedback through activation of an electrostatic conductive layer.

FIGS. 2A-2E depict a cross-section of a cover assembly, taken along section A-A of FIG. 1, illustrating providing electrostatic haptic feedback through activation of the conductive layer. FIG. 2A illustrates an object, such as a user's finger 212, in contact with an input surface 208 of a cover assembly 206. The user's finger 212 in contact with the input surface 108 is illustrated at a second time in FIG. 2B, at a third time in FIG. 2C, at a fourth time in FIG. 2D, and at a fifth time in FIG. 2E, as the user's finger 212 moves across the input surface 208.

As depicted in FIG. 2A, the cover assembly 206 may be depicted as a single layer for clarity. In general, the cover assembly 206 may include a cover sheet layer, a touch sensor layer below the cover sheet layer, and additional layers above the cover sheet (e.g., an electrostatic conductive layer and a passivation layer) for providing electrostatic haptic feedback at the input surface 208. Examples of these additional layers of the cover assembly 206 are described below with respect to FIGS. 3-5. At the first time depicted in FIG. 2A the cover assembly 206 may not generate electrostatic haptic feedback.

Figure 2B:
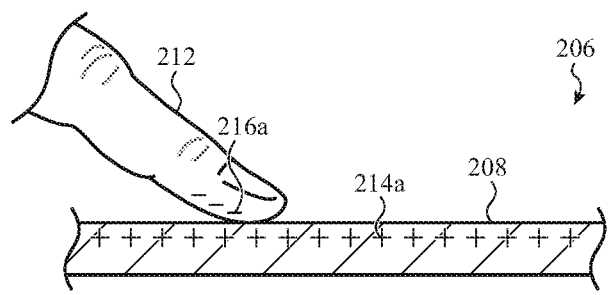
FIG. 2B depicts the cross-section of FIG. 2A, illustrating providing electrostatic haptic feedback through activation of the electrostatic conductive layer.
Figure 2C:
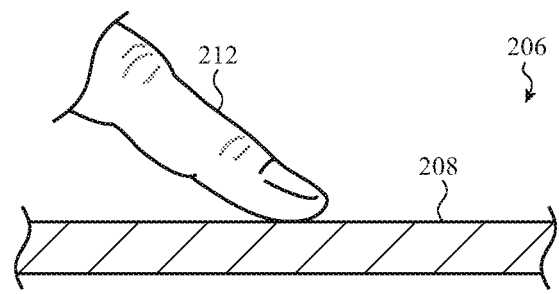
FIG. 2C depicts the cross-section of FIG. 2A, illustrating providing electrostatic haptic feedback through activation of the electrostatic conductive layer.

At the second time, as depicted in FIG. 2B, the cover assembly 206 may generate electrostatic haptic feedback. For example, the cover assembly 206 may include an electrostatic conductive layer, which may be electrically coupled to a drive signal (such as depicted further with respect to FIG. 3). The electrostatic conductive layer includes an array of conductive particles.

When activated, the electrostatic conductive layer may produce an electrostatic charge 214a on the input surface 208. The electrostatic charge 214a at the input surface 208 may induce a corresponding and opposite charge 216a in the user's finger 212, which may generate an attractive force between the user's finger 212 and the input surface 208. This attractive force may produce tactile feedback to a user in the form of modified friction as the user's finger 212 moves across the input surface 208.

The sensation of the electrostatic haptic feedback may controllably cause the perception of a rough sensation, or alternatively a sandy, wavy, or similar sensation. The sensations may further be controlled to provide more or less intense sensations. The electrostatic conductive layer of the cover assembly 206 may cause a uniform type and intensity of frictional sensation (e.g., through a uniform electrostatic charge 214a), or the type and intensity may vary across the user input region 212a (e.g., through a varying electrostatic charge 214a). For example, the sensation may become more intense as a user's finger nears particular regions of the input surface 208, such as a virtual key or button (e.g., an input region) visually indicated by the display. Thus, the cover assembly 206 may provide variable friction feedback at the input surface 208.

In some embodiments, the electrostatic charge 214*a* may be maintained constant, and in other embodiments the electrostatic charge may vary in polarity and/or intensity. For example, the polarity of the electrostatic charge may reverse. Accordingly, at the third time, depicted in FIG. 2C, the input surface 208 becomes electrostatically neutral (e.g., uncharged), and at the fourth time, depicted in FIG. 2D, the electrostatic conductive layer produces a reversed electrostatic charge 214*b* at the input surface 208.

Figure 2D:
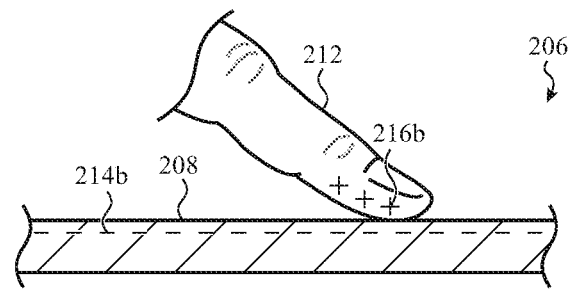
FIG. 2D depicts the cross-section of FIG. 2A, illustrating providing electrostatic haptic feedback through activation of the electrostatic conductive layer.

Similar to the second time depicted in FIG. 2B, at the fourth time of FIG. 2D the reversed electrostatic charge 214*b* at the input surface 208 induces a corresponding and opposite charge 216*b* in the user's finger 212, which may generate an attractive force between the user's finger 212 and the input surface 208. The feedback sensations perceived by the user through the alternating electrostatic charges 214*a*, 214*b* may be controlled through changing the intensity and/or the frequency of the electrostatic charges 214*a*, 214*b*.

Figure 2E:
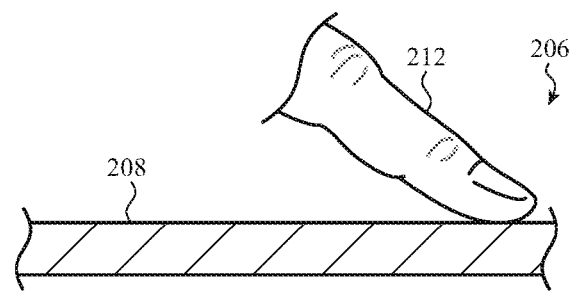
FIG. 2E depicts the cross-section of FIG. 2A, illustrating providing electrostatic haptic feedback through activation of the electrostatic conductive layer.

Finally, at the fifth time, depicted in FIG. 2E, the input surface 208 of the cover assembly 206 may become electrostatically neutral (e.g., uncharged). In some examples, the electrostatic conductive layer may cease to produce the electrostatic charge (e.g., 214*a*, 214*b*) on the input surface 208 in response to changes in controlling signals. In other examples, only a portion of the input surface 208 may be electrostatically charged, and the user's finger 212 may move to another portion of the input surface 208 which is not electrostatically charged, where the user ceases to perceive the increased friction sensation.

Figure 3:
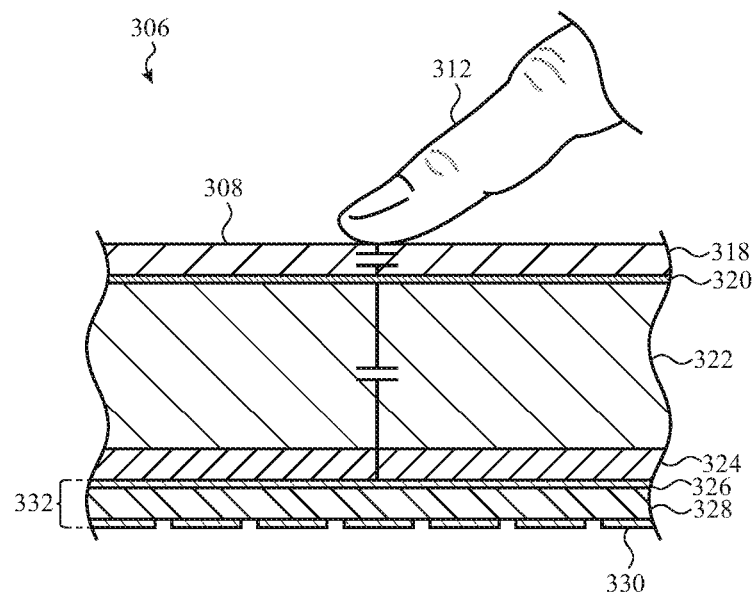
FIG. 3 depicts another cross-section of a cover assembly, taken along section A-A of FIG. 1, illustrating capacitive coupling of the electrostatic conductive layer to a touch sensor layer.

FIG. 3 depicts another cross-section of a cover assembly, taken along section A-A of FIG. 1, illustrating capacitive coupling of the conductive layer to a touch sensor layer. The cover assembly 306 includes a cover sheet layer 322, an electrostatic conductive layer 320, a passivation layer 318, and a touch sensor 332.

At least a portion of the cover assembly 306 can function as an input surface 308 that receives touch and/or force inputs. The cover assembly 306 may also produce haptic feedback to an object, such as a user's finger 312, in contact with the input surface 308. Haptic feedback may be produced as an electrostatic haptic feedback, which may cause the user to perceive changes in friction between the user's finger 312 and the input surface 308.

Generally, the cover sheet layer 322 provides structural rigidity to the cover assembly 306, and may additionally enclose and protect the touch sensor 332 and a display (omitted from FIG. 3 for clarity). The cover sheet layer 322 may be formed from a suitable dielectric material, such as glass, plastic, sapphire (alumina), acrylic, ceramic, and other non-conductive materials or combinations of materials. In some embodiments, such as a cover assembly 306 positioned over a display, the cover sheet layer 322 may be transparent. In other embodiments, the cover sheet layer 322 may be formed from an opaque material and/or include an opaque layer, such as an ink layer.

While in these examples the term "cover assembly" may refer to a cover for a display of a portable electronic device, it should be understood that the term "cover assembly" may also refer to another input surface, such as a trackpad of a laptop computer or a portion of a housing (such as the housing 102 depicted in FIG. 1). In some examples, the cover assembly 306 may enclose a virtual keyboard having dynamically adjustable input regions, which may be indicated through electrostatic haptic feedback provided by the electrostatic conductive layer 320.

An electrostatic conductive layer 320 may be coupled to the cover sheet layer 322, and a passivation layer 318 may be coupled to the electrostatic conductive layer 320. For example, the electrostatic conductive layer 320 may be deposited onto a top surface of the cover sheet layer 322 facing outward from the electronic device. The passivation layer 318 (which may be an insulating layer) may likewise be deposited over the electrostatic conductive layer 320.

Figure 4:
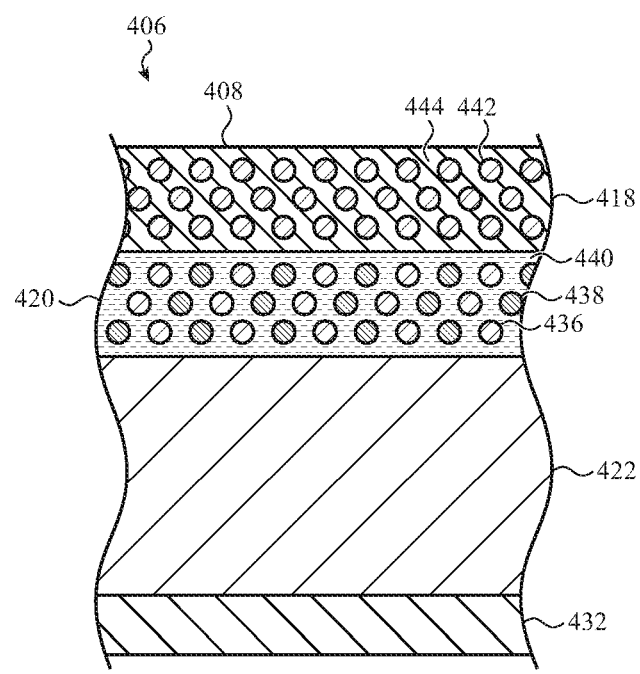
FIG. 4 depicts another cross-section of a cover assembly, taken along section A-A of FIG. 1, illustrating particles within an electrostatic conductive layer and a passivation layer.

The electrostatic conductive layer 320 may be formed with conductive particles within a non-conductive compound, such as described further with respect to FIG. 4. As an example, conductive particles may be dispersed within an organic epoxy, and the epoxy may be deposited over the cover sheet layer 322 and cured to form the electrostatic conductive layer 320. The passivation layer 318 may be formed with non-conductive particles within a similar compound, such as described further with respect to FIG. 4

In some embodiments, the electrostatic conductive layer 320 may be indirectly electrically charged, such as through a capacitive coupling to another layer or component of the cover assembly 306. For example, a touch sensor 332 positioned below the cover sheet layer 322 may include one or more drive touch electrodes 326 and sense touch electrodes 330 separated by an insulating substrate 328. A drive touch electrode 326 may be coupled to a drive signal, which may induce an electric field, capacitively coupling the drive touch electrode 326 to at least a portion of the electrostatic conductive layer 320.

Due to the electric field coupling the drive touch electrode 326 to the electrostatic conductive layer 320, the electrostatic conductive layer 320 becomes electrostatically charged. The electrostatic charge generates or increases an attractive force between the electrostatic conductive layer 320 and a user's finger 312, which may be due to a capacitive coupling between the user's finger 312 and the electrostatic conductive layer 320. The passivation layer 318 may act as an insulating layer separating and facilitating the capacitive coupling of the user's finger 312 and the electrostatic conductive layer 320.

The attractive force between the user's finger 312 and the electrostatic conductive layer 320 may cause the user's finger 312 to be pulled against the input surface 308 (e.g., against the passivation layer 318). This may in turn increase the friction between the user's finger 312 and the input surface 308 as the user's finger 312 slides along the input surface 308. The aforementioned attractive force is generally perpendicular to the direction in which the user's finger 312 moves along the input surface 308. Accordingly, when the attractive force is present, the user's finger is drawn into greater contact with the input surface 308, thereby increasing friction between that layer and the user's finger 312 (or other object contacting the layer).

The sensation of friction induced by the electrostatic conductive layer 320 may controllably cause a user to perceive a rough sensation, or alternatively a sandy, wavy, or similar sensation. The sensations may further be controlled to provide more or less intense sensations. The electrostatic conductive layer 320 may cause a uniform type and intensity of frictional sensation, or the type and intensity may vary across the input surface 308 as different drive touch electrodes 326 receive distinct drive signals. For example, the sensation may become more intense as a user's finger 312 nears a given region, such as a virtual key or button (e.g., an input region). In some examples, distinct input regions may be driven by distinct drive signals, such that the intensity or sensation at a first input region is distinct from the intensity and/or sensation at a second input region.

The drive touch electrodes 326 may be controlled by processing circuitry and/or a signal generator (described further below with respect to FIG. 11). Each of the drive touch electrodes 326 may be individually controlled, or a group of drive touch electrodes 326 may be controlled together. The control circuitry may apply a drive signal (e.g., an electrical signal) to a drive touch electrode 326 (or group of drive touch electrodes 326) to activate and/or energize all or a portion of the electrostatic conductive layer 320. The drive signal may induce an electrostatic charge or potential (e.g., through capacitive coupling) within a corresponding portion of the electrostatic conductive layer 320 (e.g., a portion of the electrostatic conductive layer 320 substantially above the drive touch electrode 326 receiving the drive signal).

The processing circuitry may cause the signal generator to apply distinct signals (e.g., by varying a voltage or current waveform) to different drive touch electrodes 326. This results in different electrostatic charges between one portion of the electrostatic conductive layer 320 and another, such that the attractive force (and therefore friction) varies as a user's finger moves along the input surface 308.

In some examples, the processing circuitry may additionally be electrically coupled to the touch sensor 332. The touch sensor 332 may detect the location of one or more objects, such as the user's finger 312, in contact with the input surface 308. As a result of the detected touch on the input surface, the processing circuitry may cause a drive signal to be coupled to one or more drive touch electrodes 326 (e.g., by causing the signal generator to transmit a drive signal to the drive touch electrodes 326) at a location corresponding to the detected touch. This may, in turn, generate friction feedback at a portion of the input surface 308 corresponding to the detected touch.

In other examples, the processing circuitry may operate the drive touch electrodes 326 in concert with other components of the electronic device, such as a display (e.g., display 104 depicted in FIG. 1). For example, the display may visually indicate a location of a feedback region, such as a virtual key or button, or an image or icon displayed (e.g., a region that appears rough visually). A drive signal may be sent to a drive touch electrode 326 at a location corresponding to the feedback region, which may cause frictional feedback to be perceived by a user at the location of the feedback region (e.g., by causing a rough sensation over the region that appears rough).

In order to create perceptible friction sensations to a user, drive touch electrodes 326 may be energized with electrical drive signals of approximately 100 to 400 volts (or more, depending on the sizes and materials of the adhesive layer 324, the cover sheet layer 322, the electrostatic conductive layer 320, and the passivation layer 318) and frequencies of approximately 100 to 500 Hertz. Varying the voltage and waveform of the drive signal may generate varying sensations (e.g., rough, sandy, wavy) and intensity levels to a user. For example, increasing the voltage of the signal to a drive touch electrode 326 may increase the attractive force between the user's finger 312 and the electrostatic conductive layer 320, which in turn causes a more intense sensation of friction.

As described above, the touch sensor 332 may be formed from an array of drive touch electrodes 326 disposed on an insulating substrate 328, and may additionally include an array of sense touch electrodes 330 disposed on the insulating substrate 328. The drive touch electrodes 326 and sense touch electrodes 330 are configured to detect the location of a finger or object on or near the cover sheet layer 322.

The touch sensor 332 may operate in accordance with a number of different sensing schemes. In some implementations, the touch sensor 332 may operate in accordance with a mutual-capacitance sensing scheme. Under this scheme, the drive touch electrodes 326 may be substantially linear transparent conductive traces disposed on a first surface of the insulating substrate 328, the traces spanning along a first direction. The sense touch electrodes 330 may be intersecting conductive transparent conductive traces disposed on a second, parallel surface of the insulating substrate 328, the traces spanning along a second direction transverse to the first direction. The touch sensor 332 is configured to detect the location of a touch by monitoring a change in capacitive or charge coupling between pairs of intersecting drive touch electrodes 326 and sense touch electrodes 330.

In another implementation, the touch sensor 332 may operate in accordance with a self-capacitive sensing scheme. Under this scheme, the touch sensor 332 may include an array of drive touch electrodes 326, which may be capacitive electrodes or pads disposed on a surface of the insulating substrate 328. The drive touch electrodes 326 may be configured to detect the location of a touch by monitoring a change in self-capacitance of a small field generated by each drive touch electrode 326. In other implementations, a resistive, inductive, or other sensing scheme could also be used, and in some of these embodiments another component may drive the electrostatic conductive layer 320.

The drive touch electrodes 326 and sense touch electrodes 330 may be formed by depositing or otherwise fixing a transparent conductive material to the insulating substrate 328. Potential materials for the insulating substrate 328 include, for example, glass or transparent polymers like polyethylene terephthalate or cyclo-olefin polymer. Example transparent conductive materials include polyethyleneioxythiophene, indium tin oxide, carbon nanotubes, graphene, piezoresistive semiconductor materials, piezoresistive metal materials, silver nanowire, other metallic nanowires, and the like. The transparent conductors may be applied as a film or may be patterned into an array on the surface of the substrate using a suitable disposition technique such as, but not limited to: vapor deposition, sputtering, printing, roll-to-roll processing, gravure, pick and place, adhesive, mask-and-etch, and so on.

The touch sensor 332 may be coupled to the cover sheet layer 322 through an adhesive layer 324, which may be an optically clear adhesive. In some embodiments, the adhesive layer 324 may be omitted and all or a portion of the touch sensor 332 may be formed directly on the cover sheet layer 322 (e.g., by depositing an array of drive touch electrodes 326 directly onto a bottom surface of the cover sheet layer 322).

Figure 5:
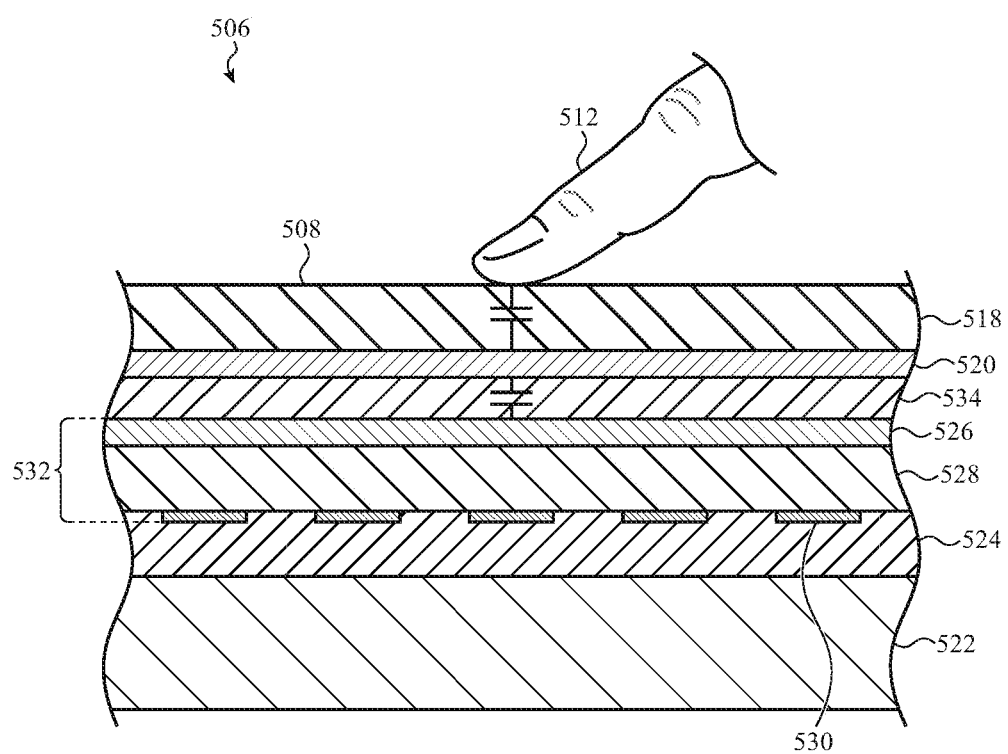
FIG. 5 depicts another cross-section of a cover assembly, taken along section A-A of FIG. 1.

It should be understood that FIG. 3 presents a cross-sectional view which may omit certain components for clarity. For example, the cover assembly may be coupled to a display and additional layers. The electronic device may also include additional components and structures, such as the components depicted in FIG. 11, support structures, and the like. In some embodiments, the arrangement of the layers depicted may also vary, in which some layers may be positioned differently relative to others (such as depicted in FIG. 5), additional layers may be included, or some layers may be omitted.

Turning to FIG. 4, the electrostatic conductive layer and the passivation layer may be formed from particles within a compound. FIG. 4 depicts another cross-section of a cover assembly, taken along section A-A of FIG. 1. The cover assembly 406 may include a cover sheet layer 422, which may provide structural rigidity and support to other components of the cover assembly 406. A touch sensor 432 may be coupled to a bottom of the cover sheet layer 422 (e.g., internal to the electronic device).

An electrostatic conductive layer 420 may be coupled to a top of the cover sheet layer 422, and a passivation layer 418 may be coupled to a top of the electrostatic conductive layer 420 (e.g., forming an external surface of the electronic device). The electrostatic conductive layer 420 may be formed with conductive particles 438 and non-conductive particles 436 within a non-conductive compound, such as an organic matrix 440.

In some examples, the organic matrix 440 may be an epoxy. The organic matrix 440 may be formed with any appropriate epoxy resin, such as bisphenol A resins, bisphenal F resins, novolac resins, aliphatic resins, glycidylamine resins, and so on. In some embodiments, the material of the organic matrix 440 may be selected to enhance the performance of the cover assembly 406, such as impact resistance. In a particular embodiment, the cover assembly 406 may enclose a display, and the organic matrix 440 may be formed from an optically transparent epoxy.

The conductive particles 438 may be formed from transparent conductive materials, such as indium tin oxide, tin oxide, aluminum zinc oxide, indium zinc oxide, or a transparent conductive oxide. In embodiments in which the cover assembly 406 is opaque, the conductive particles 438 may be formed from opaque conductive materials, such as gold, copper, aluminum, tin, and other combinations and alloys of conductive materials. The non-conductive particles 436 may be formed from one or more suitable transparent non-conductive materials. In embodiments in which the cover assembly 406 is opaque, the non-conductive particles 436 may be formed from opaque materials.

In some embodiments, the conductive particles 438 may be disposed within the organic matrix 440 at a sufficient density to enable a sufficient electrostatic charge to be placed on the electrostatic conductive layer 420 to produce frictional haptic feedback at the input surface 408. However, if the conductive particles 438 are disposed at a uniform high density, the electrostatic conductive layer 420 may become an electromagnetic shield, undesirably blocking the operation of the touch sensor 432 and other components of the electronic device.

Accordingly, non-conductive particles 436 and conductive particles 438 may be included within the organic matrix 440 to ensure the electrostatic conductive layer 420 operates to produce haptic feedback and does not interfere with the operation of other components. For example, the conductive particles 438 and non-conductive particles 436 may be disposed within the organic matrix 440 such that the electrostatic conductive layer 420 has a resistance of between 1 MΩ-per-square (one megaohm-per-square) and 100 MΩ-per-square (one hundred megaohms-per-square).

In some embodiments, the conductive particles 438 and non-conductive particles may be patterned to enhance the operation of the electrostatic conductive layer 420 and reduce interference with the operation of other components. Examples of such patterns are described below with respect to FIGS. 8A-8C.

The electrostatic conductive layer 420 may be formed over the cover sheet layer 422 in an appropriate manner. For example, the organic matrix 440 may be formed as an epoxy resin, and conductive particles 438 and non-conductive particles 436 may be added to the organic matrix 440. The organic matrix 440 may then be deposited onto the cover sheet layer 422 and cured to form a hardened electrostatic conductive layer 420. The formation of the electrostatic conductive layer 420 is further described below with respect to FIG. 10.

The passivation layer 418 may be a suitable dielectric layer, which may seal the electrostatic conductive layer 420 and define the input surface 408, which may be an external surface of the electronic device. In some embodiments, the passivation layer 418 may be formed as a single uniform layer, and in other embodiments the passivation layer 418 may be non-uniform and/or formed as multiple layers of distinct materials or combinations of materials. In some examples, the passivation layer 418 may include an organic or inorganic film, which may be bonded to the electrostatic conductive layer 420 through an adhesive or other appropriate technique.

In a particular embodiment, the passivation layer 418 may be formed from an organic matrix 444, such as an epoxy resin. The epoxy resin may be the same as the organic matrix 440 of the electrostatic conductive layer 420, or it may be a distinct epoxy resin having material properties to provide a durable external surface of the cover assembly 406 and the electronic device. The organic matrix 444 may be formed from a transparent epoxy resin, and may additionally include non-conductive particles 442.

The non-conductive particles 442 may be formed from one or more suitable transparent non-conductive materials. In some embodiments, the non-conductive particles 442 may be formed from materials which improve the hardness, rigidity, scratch resistance, and other features of the passivation layer 418, such as silicon carbide or a diamond-like carbon. In embodiments in which the cover assembly 406 is opaque, the non-conductive particles 442 may be formed from opaque materials.

The passivation layer 418 may be formed over the electrostatic conductive layer 420 in an appropriate manner. For example, the organic matrix 444 may be formed as an epoxy resin, and non-conductive particles 442 may be added to the organic matrix 444. The organic matrix 444 may then be deposited onto the electrostatic conductive layer 420 and cured to form a hardened passivation layer 418. In some embodiments, the passivation layer 418 may form the input surface 408, while in other embodiments additional coatings or layers may be added to the passivation layer 418, such as oleophobic coatings, anti-glare coatings, and so on. The formation of the electrostatic conductive layer 420 is further described below with respect to FIG. 10.

FIG. 5 depicts another cross-section of a cover assembly, taken along section A-A of FIG. 1. The cover assembly 506 includes a cover sheet layer 522, an electrostatic conductive layer 520, a passivation layer 518, and a touch sensor 532.

The touch sensor 532 may be coupled to a top surface (e.g., a surface facing the input surface 508) of the cover sheet layer 522. The touch sensor 532 may be coupled to the cover sheet layer 522 through an adhesive layer 524, which may be an optically clear adhesive. In some embodiments, the adhesive layer 524 may be omitted and all or a portion of the touch sensor 532 may be formed directly on the cover sheet layer 522 (e.g., by depositing an array of drive touch electrodes 526 directly onto a bottom surface of the cover sheet layer 522).

An electrostatic conductive layer 520 may be coupled to the touch sensor 532, and a passivation layer 518 may be coupled to the electrostatic conductive layer 520. An insulating substrate 534 may be positioned between the electrostatic conductive layer 520 and the touch sensor 532. In some embodiments, the electrostatic conductive layer 520 and the passivation layer 518 may be formed separate from other components of the cover assembly 506, and the insulating substrate may be an adhesive layer coupling the electrostatic conductive layer 520 and the passivation layer 518 to the touch sensor 532.

In other embodiments, the insulating substrate 534 may be an epoxy or similar layer deposited over the touch sensor 532, which is then cured. The electrostatic conductive layer 520 and the passivation layer 518 may then be deposited onto the insulating substrate 534 and cured to form hardened layers over the insulating substrate 534.

The electrostatic conductive layer 520 may be formed with conductive particles within a non-conductive compound, such as described further with respect to FIG. 4. The passivation layer 518 may be formed with non-conductive particles within a similar compound, such as described further with respect to FIG. 4

The touch sensor 532 may include one or more drive touch electrodes 526 and sense touch electrodes 530 separated by an insulating substrate 528. A drive touch electrode 526 may be coupled to a drive signal, which may induce an electric field, capacitively coupling the drive touch electrode 526 to at least a portion of the electrostatic conductive layer 520.

Due to the electric field coupling the drive touch electrode 526 to the electrostatic conductive layer 520, the electrostatic conductive layer 520 becomes electrostatically charged. The electrostatic charge generates or increases an attractive force between the electrostatic conductive layer 520 and a user's finger 512, which may be due to a capacitive coupling between the user's finger 512 and the electrostatic conductive layer 520. The passivation layer 518 may act as an insulating layer separating and facilitating the capacitive coupling of the user's finger 512 and the electrostatic conductive layer 520.

Other embodiments can implement haptic feedback in another manner. For example, FIGS. 6A-7B depict example cover assemblies incorporating a piezoelectric haptic element to provide vibratory and/or friction feedback at an input surface of an electronic device. A haptic output can, in some examples, be a localized decrease in perceived friction between the user's finger and the interface surface. To generate the haptic output, the input/output interface drives a piezoelectric body below the interface surface at a high frequency (e.g., ultrasonic), thereby causing the interface surface to vibrate. As a result, when the user's finger moves across the interface surface, the user may perceive decreased friction due to decreased contact area or time between the user's finger and the interface surface.

In this example, certain regions of the interface surface may be perceived to be higher friction regions (e.g., above a piezoelectric body not driven or driven to a lower voltage, at a lower frequency, or at a lower duty cycle) whereas other regions may be perceived to be lower friction regions (e.g., above a piezoelectric body to a higher voltage, at a higher frequency, or at a higher duty cycle).

In another example, the haptic output generated by an input/output interface can be a localized vibration, translation, or other mechanical agitation of the interface surface. To generate the haptic output, the input/output interface drives an electrode of a piezoelectric body below the interface surface at a low frequency (e.g., 100 Hz to 200 Hz), thereby mechanically agitating the interface surface. In this manner, when the user's finger moves across the interface surface, the user may perceive a mechanical agitation of the interface surface such as a click, a pop, a vibration, and so on.

Figure 6A:
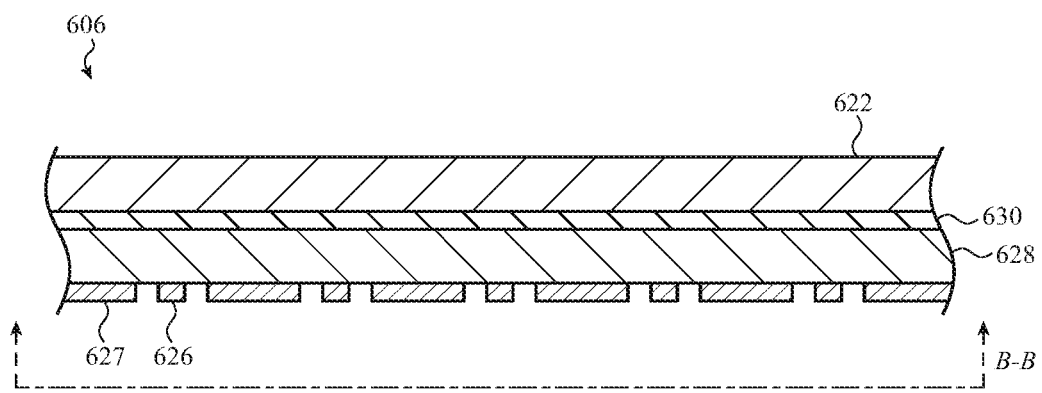
FIG. 6A depicts a cross-section of a touch sensor, such as described herein, particularly illustrating electrodes of the touch sensor and a piezoelectric haptic element disposed on the same surface.
Figure 6B:
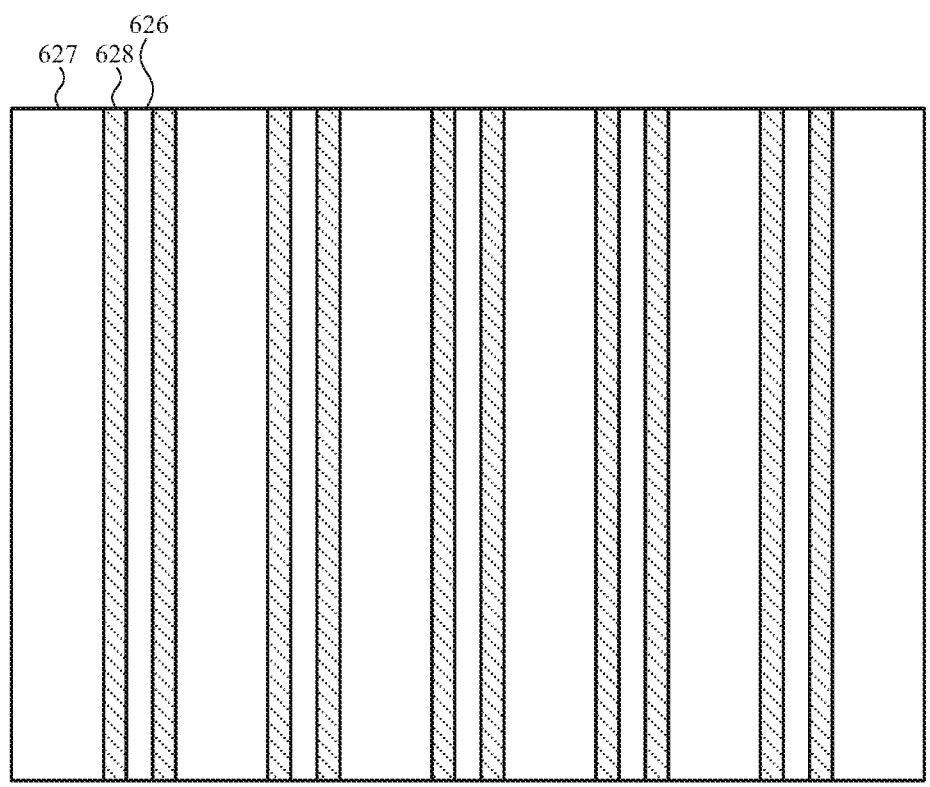
FIG. 6B depicts the touch sensor of FIG. 6A when viewed along section line B-B.

FIGS. 6A-6B depict a cross-section of a cover assembly 606 particularly illustrating electrodes of a touch sensor and a piezoelectric haptic element disposed on the same surface. More particularly, the cover assembly 606 includes an insulating substrate 628 that separates a first set of electrodes generally oriented in a first direction (one of which is visible, and identified as a sense touch electrode 630) from a second set of electrodes oriented in a second direction (one of which is identified as a drive touch electrode 626, and another is identified as a drive haptic electrode 627). These components of the cover assembly 606 can be positioned below and (optionally) adhered or otherwise coupled to a cover sheet layer 622. The cover assembly 606 can be configured to detect touch input, and in some embodiments may additionally or alternatively detect force input.

In some embodiments, the first set of electrodes is oriented perpendicular to the second set of electrodes to define a grid of overlapping regions that may be individually addressable by coupling specific electrodes of the first set and specific electrodes of the second set to drive and/or sense circuitry (e.g., coupling the drive touch electrode 626 to drive circuitry and coupling the sense touch electrode 630 to sense circuitry). In other examples, the first set of electrodes and/or the second set of electrodes can be arranged and/or segmented in a different manner. For example, one or both of the first set or the second set may be further segmented.

In this embodiment, the insulating substrate 628 of the cover assembly 606 is formed from a piezoelectric material. Example piezoelectric materials include both leaded and lead-free niobates and titanates such as PZT, KNN, NBT-BT, BCT-BZT, and so on. The piezoelectric material may be transparent or opaque and can be disposed and/or formed using any suitable technique such as, but not limited to, sputtering, physical layer deposition, sol gel deposition/printing/gravure, and so on.

In some embodiments, each of the layers of the cover assembly 606 may be deposited or otherwise formed onto the cover sheet layer 622. For example, the sense touch electrodes 630 may be deposited onto the cover sheet layer 622 through an appropriate technique, such as vapor deposition, printing, gravure, roll-to-roll deposition, and so on. The insulating substrate 628 may then be deposited below the sense touch electrodes 630. The drive touch electrodes 626 and drive haptic electrodes 627 may then be formed on the insulating substrate 628, through an appropriate technique such as described with respect to the sense touch electrodes 630.

In other embodiments, the sense touch electrodes 630, drive touch electrodes 626, and drive haptic electrodes 627 may be formed onto the insulating substrate 628. This touch/haptic assembly may then be coupled to the cover sheet layer 622 through an optically clear adhesive or another appropriate technique.

As a result of this construction, the cover assembly 606 can be configured to simultaneously receive user input and provide haptic output. More particularly, a first subset of electrodes of the first and second set of electrodes can be associated with haptic output while a second subset of electrodes of the first and second set of electrodes can be associated with sensing input. For example, the drive haptic electrode 627 (of the second set of electrodes) may be associated with haptic output while the drive input electrode 626 is associated with touch input and/or force input detection.

Haptic output can be provided by the piezoelectric body of the insulating substrate 628 by applying a voltage across the insulating substrate 628 via the drive haptic electrode 627 while, simultaneously, touch and/or force input are received via the drive input electrode 626. The sense touch electrodes 630 may provide a reference voltage for both touch sensing and haptic feedback.

Figure 7A:
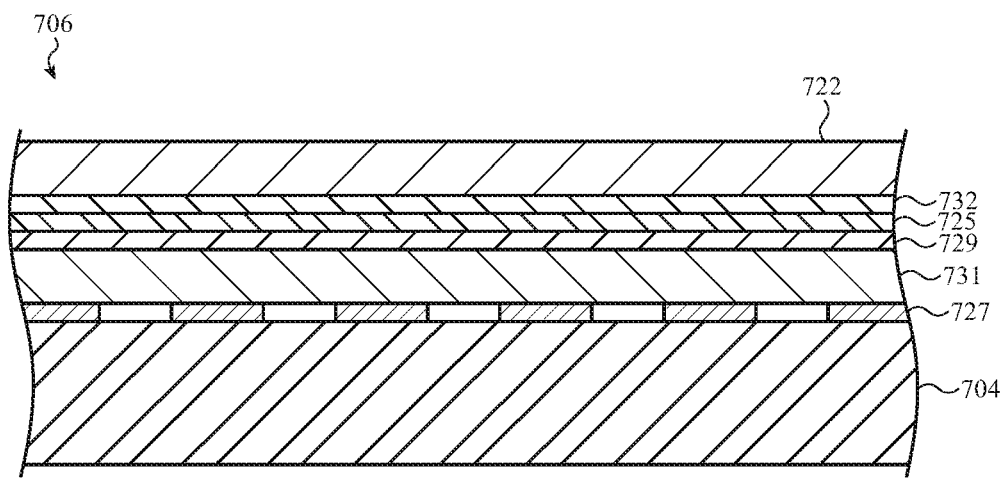
FIG. 7A depicts a cross-section of a cover assembly, such as described herein, particularly illustrating a piezoelectric haptic element disposed above a display.

In another embodiment, a cover assembly can provide piezoelectric feedback through a separate layer from the touch sensor. More particularly, FIG. 7A depicts a cover assembly 706 that includes a touch sensor 732, which may include a substrate separating two electrode layers which have been omitted from FIG. 7A for clarity. The touch sensor 732 can be configured to detect touch input and/or force input from a user. A haptic output module is positioned below the touch sensor 732, separated by a stiffener layer 725.

The haptic output module includes a piezoelectric substrate 731 separating a first and second set of electrodes. The piezoelectric substrate 731 may be formed from an appropriate piezoelectric material, similar to the insulating substrate 628 depicted in FIGS. 6A-6B. The first set of electrodes, oriented along a first direction, are identified as reference haptic electrodes 729. The second set of electrodes, oriented along a second direction transverse to the first direction, are identified as drive haptic electrodes 727.

As depicted in FIG. 7A, a display 704 is positioned below the cover assembly 706. Accordingly, the materials of the cover assembly 706 may be optically transparent, including the touch sensor 732, the stiffener layer 725, the reference haptic electrodes 729, the piezoelectric substrate 731, and the drive haptic electrodes 727. These layers may be formed together as described above with respect to FIGS. 6A-6B.

For example, the stiffener layer 725 may be formed from glass, silicon, plastic, or another sufficiently rigid material. The touch sensor 732 may be formed on a first surface of the stiffener 725. Some or all of the components of the haptic output module, such as the reference haptic electrodes 729, the piezoelectric substrate 731, and the drive haptic electrodes 727 may be formed on a second surface of the stiffener layer 725. By coupling the haptic output module to the stiffener layer 725, the haptic effect of actuating the piezoelectric substrate 731 may be amplified.

Figure 7B:
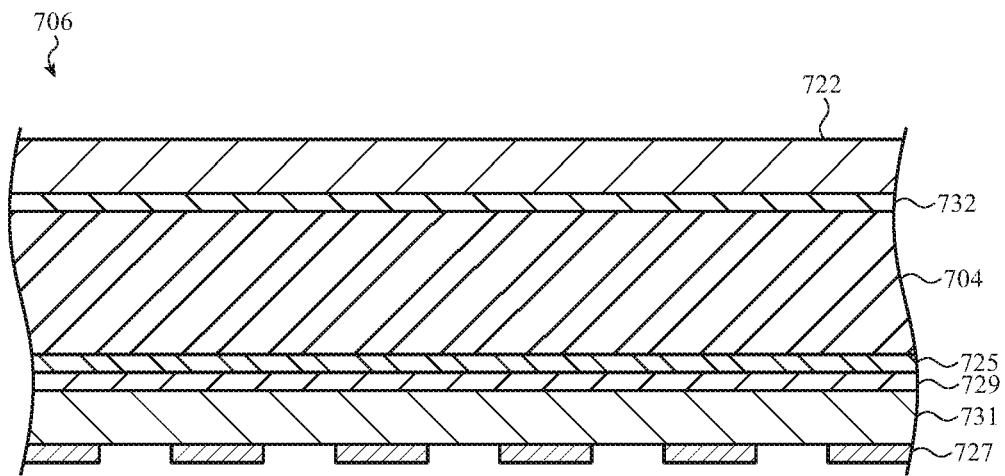
FIG. 7B depicts a cross-section of a cover assembly, such as described herein, particularly illustrating a piezoelectric haptic element disposed below a display.

As shown in FIG. 7B, in some examples the haptic output module may be positioned below the display 704, while the touch sensor 732 is positioned above the display 704. Accordingly, the stiffener layer 725 may be below the display 704, and the reference haptic electrodes 729, the piezoelectric substrate 731, and the drive haptic electrodes 727 may be coupled to or formed on the stiffener layer 725.

Figure 8A:
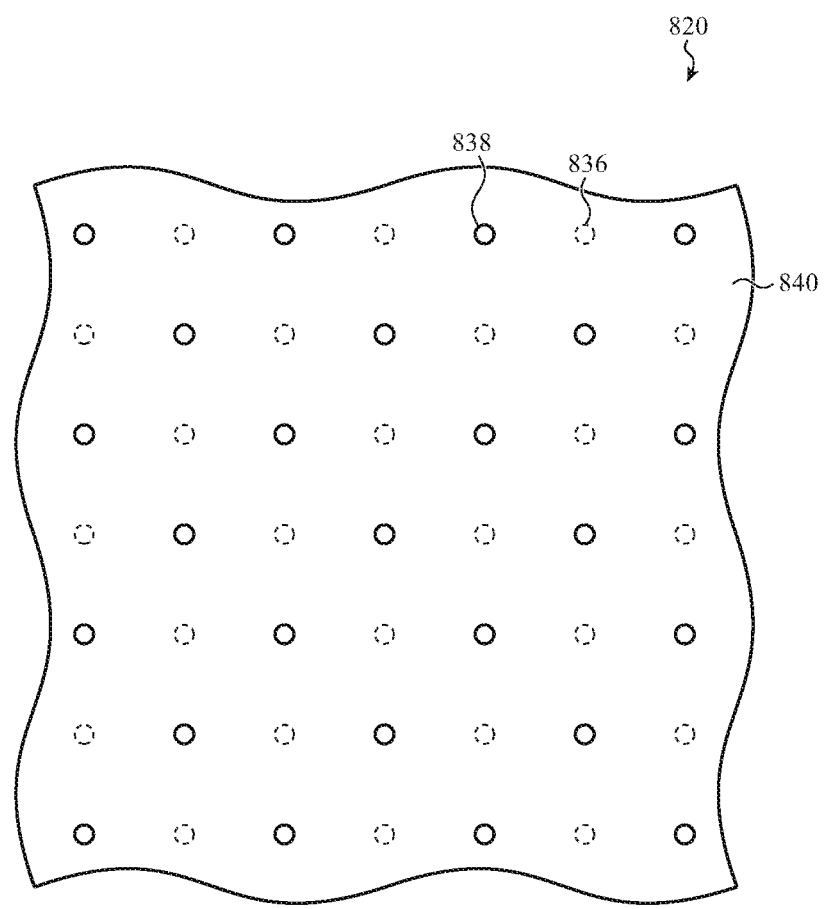
FIG. 8A depicts an example particle arrangement for an electrostatic conductive layer.
Figure 8B:
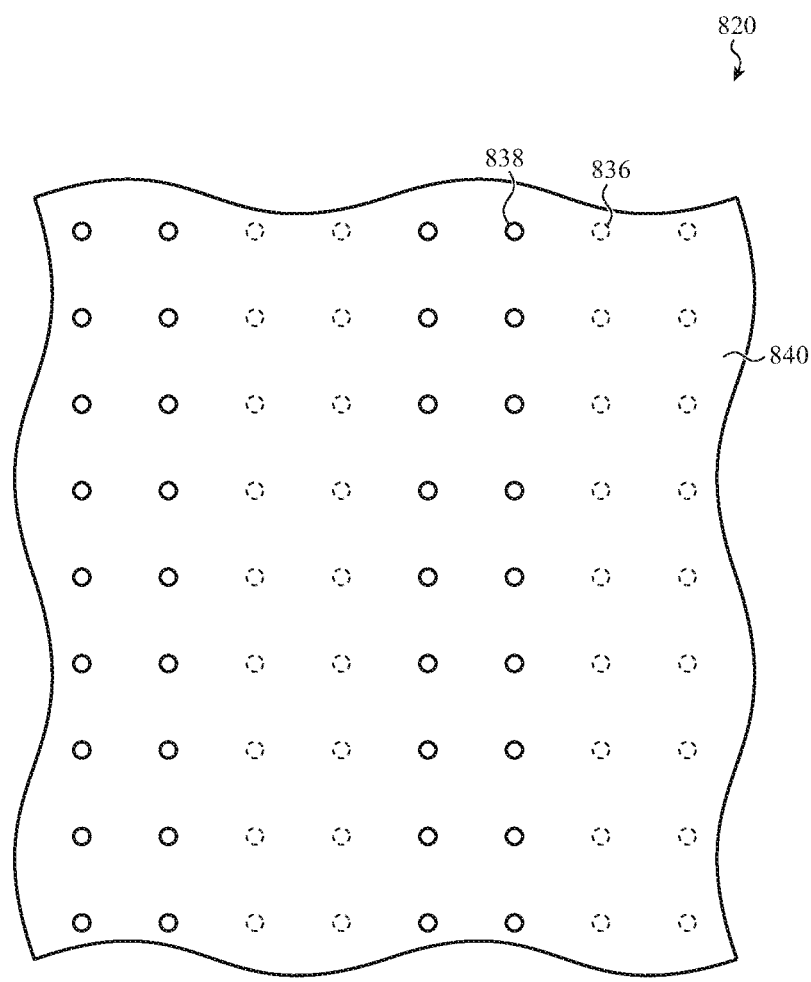
FIG. 8B depicts another example particle arrangement for an electrostatic conductive layer.
Figure 8C:
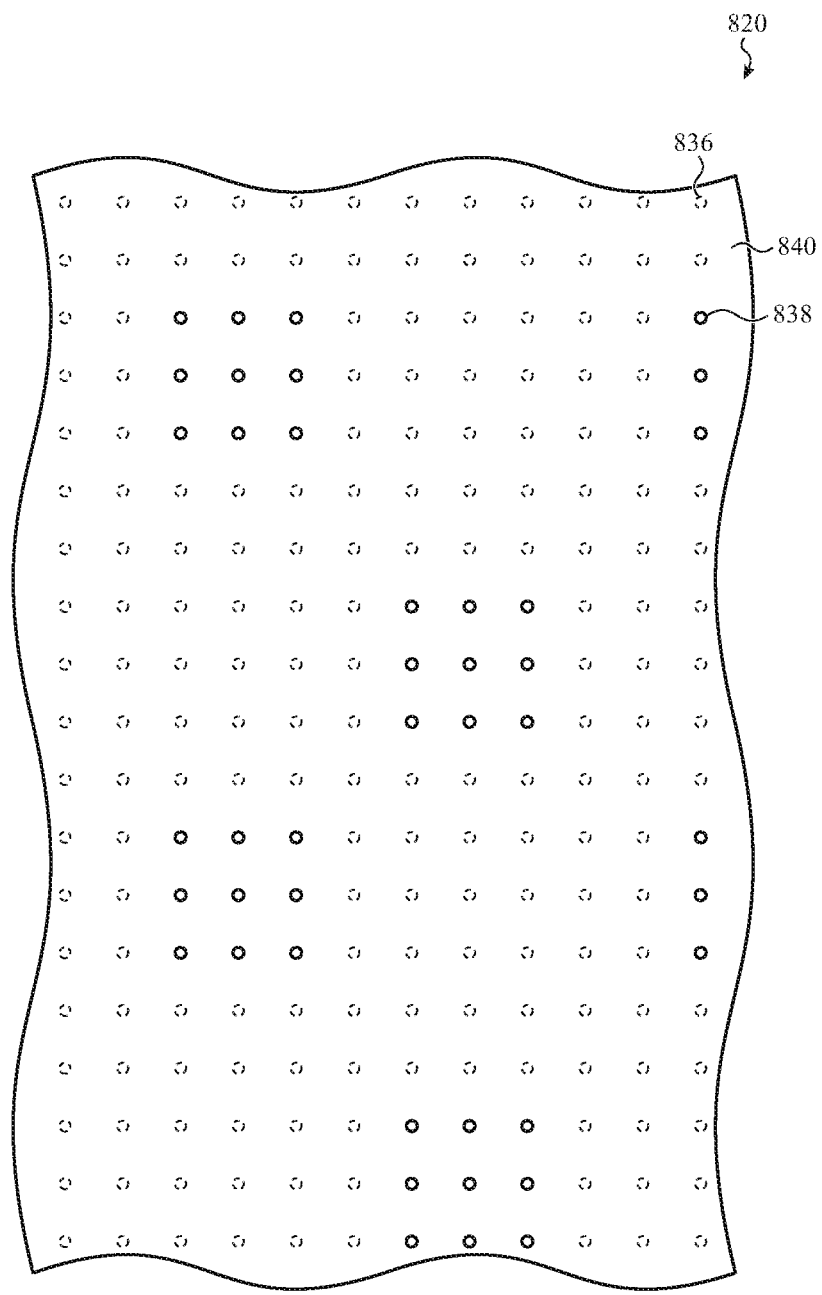
FIG. 8C depicts another example particle arrangement for an electrostatic conductive layer.

FIGS. 8A-8C depict example particle arrangements for an electrostatic conductive layer. The electrostatic conductive layer 820 includes conductive particles 838 and non-conductive particles 836 disposed within an organic matrix 840, which may be an epoxy. The electrostatic conductive layer 820 may be substantially as described above with respect to FIG. 4, and may be formed by a method or technique similar to that described below with respect to FIG. 10.

As described above, the conductive particles 838 and non-conductive particles 836 may be disposed within the organic matrix 840 in a manner to ensure the electrostatic conductive layer 420 operates to produce haptic feedback and does not interfere with the operation of other components. For example, as depicted in FIG. 8A, the conductive particles 838 and the non-conductive particles 836 may be evenly dispersed within the organic matrix 840 such that the conductive particles 838 are not concentrated in regions of the electrostatic conductive layer 820.

In some embodiments, the conductive particles 838 and non-conductive particles 836 may be patterned to enhance the operation of the electrostatic conductive layer 820 and/or reduce interference with the operation of other components. For example, as depicted in FIG. 8B, the electrostatic conductive layer 820 may be patterned such that the conductive particles 838 are concentrated within conductive regions formed as columns (or rows) which are separated by columns (or rows) of non-conductive particles 836.

In some embodiments, the columns of the conductive regions may be along the same direction as the drive touch electrodes of a touch sensor (such as the drive touch electrodes 326 depicted in FIG. 3) and may be positioned above and parallel to the drive touch electrodes. As an example, alignment of the conductive particles 838 in the conductive regions with the drive touch electrodes may enhance the capacitive coupling between the conductive particles 838 and the drive touch electrodes. In other embodiments the conductive particles 838 in the conductive regions may be offset from the drive touch electrodes, along a different direction, or otherwise unaligned with the drive touch electrodes to decrease interference with the operation of the touch sensor.

As another example, as depicted in FIG. 8C, the conductive particles 838 may be concentrated into substantially equilateral conductive regions (e.g., square, round, or other geometric shapes), separated by concentrations of non-conductive particles 836. In this pattern, the conductive particles 838 may be sufficiently concentrated within the conductive regions to provide electrostatic haptic feedback over those conductive regions, while leaving less concentrated regions for operation of the touch sensor and other components to operate without interference.

The conductive regions of concentrated conductive particles 838 depicted in FIG. 8C may effectively function as distinct electrodes, which may additionally enable the electrostatic conductive layer 820 to provide localized frictional feedback over the conductive regions. For example, the conductive regions may correspond to drive touch electrodes arrayed as conductive pads, which may be separately driven to provide varying electrostatic haptic feedback over distinct portions of the input surface of the electronic device.

It should be understood that FIGS. 8A-8C are illustrative in nature. A number of other patterns and arrangements of conductive and non-conductive particles within an epoxy may be used to create an electrostatic conductive layer according to similar principles. In addition, the depicted conductive particles 838 and non-conductive particles 839 may be representative of areas with higher concentrations of conductive particles and higher concentrations of non-conductive particles respectively. For example, the portions of the electrostatic conductive layer 820 depicted with only conductive particles 838 may also include non-conductive particles, but with relatively higher concentrations of conductive particles 838.

Figure 9A:
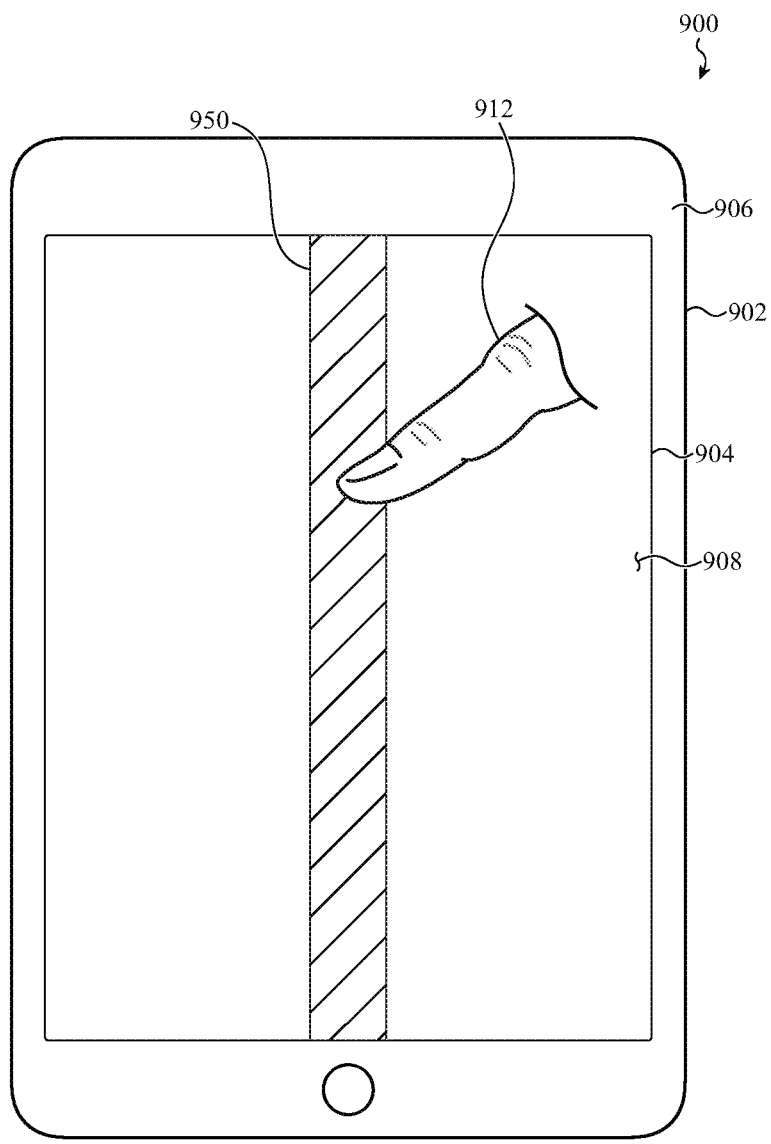
FIG. 9A depicts a top view of an electronic device according to the present disclosure, illustrating electrostatic haptic feedback on a portion of an input surface.

FIG. 9A depicts a top view of an electronic device according to the present disclosure, illustrating electrostatic haptic feedback on a portion of an input surface. The electronic device 900 of FIG. 9A includes a housing 902 at least partially enclosing a display 904. A cover assembly 906 may be positioned over the display 904 and coupled to the housing 902. The cover assembly 906 defines an input surface 908 for receiving touch and/or force inputs to the electronic device 900.

The cover assembly 906 may also selectively provide electrostatic haptic feedback to a user's finger 912 in contact with the input surface 908, such as through increased friction or similar sensations. The electrostatic haptic feedback may be provided through an electrostatic conductive layer in the cover assembly 906. The electrostatic conductive layer may be energized by a drive touch electrode positioned below the electrostatic conductive layer (e.g., as depicted above with respect to FIGS. 3 and 5).

Figure 9B:
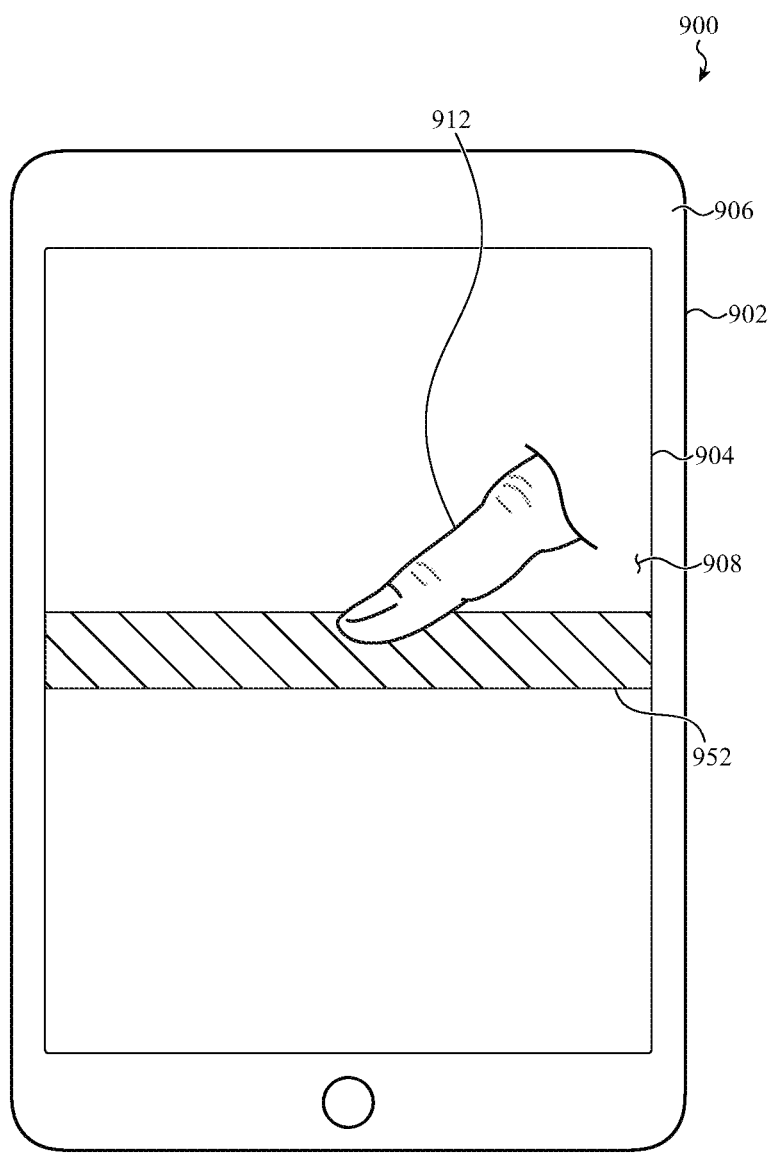
FIG. 9B depicts another top view of an electronic device according to the present disclosure, illustrating electrostatic haptic feedback on another portion of an input surface.

As one or more drive touch electrodes are energized, the user's finger 912 may experience the electrostatic haptic feedback at a feedback region 950, which may be a column across the input surface 908, which may correspond to the location of the drive touch electrode. In other examples, the drive touch electrode may be arranged in rows, and the feedback region 952 of may be a row across the input surface corresponding to the activated drive touch electrode, such as depicted in FIG. 9B.

The sensation of the electrostatic haptic feedback in a feedback region 950, 952 may controllably cause the perception of a rough sensation, or alternatively a sandy, wavy, or similar sensation. The sensations may further be controlled to provide more or less intense sensations. A feedback region 950, 952 may provide a constant frictional sensation, or the type and intensity of the frictional sensation may vary over time.

Figure 9C:
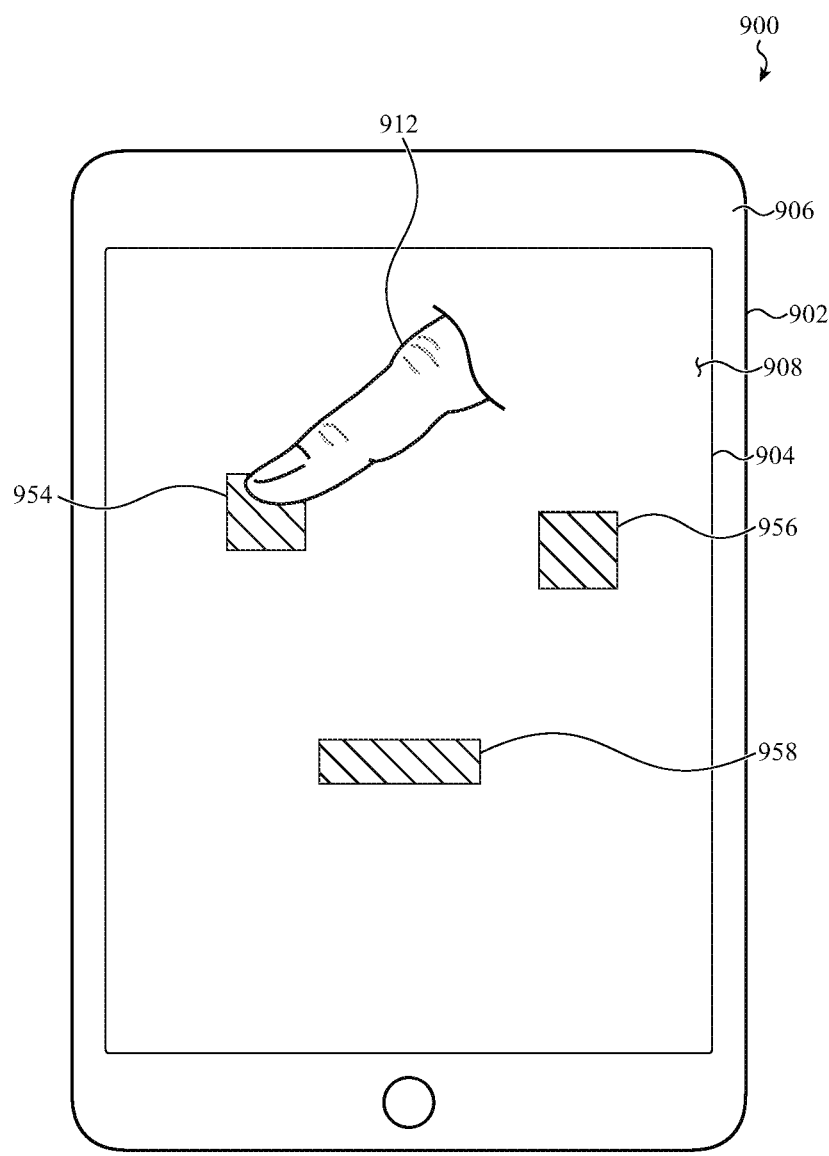
FIG. 9C depicts another top view of an electronic device according to the present disclosure, illustrating electrostatic haptic feedback on another portion of an input surface.

Turning to FIG. 9C, another top view of an electronic device is depicted, illustrating electrostatic haptic feedback on another portion of an input surface. In some embodiments, the electrostatic conductive layer and/or the drive touch electrodes may be disposed and arranged to provide more localized electrostatic haptic feedback. For example, the drive touch electrodes may be substantially equilateral conductive pads arranged in a rectilinear pattern. The electrostatic conductive layer may also be patterned to concentrate conductive particles above the drive touch electrodes.

Accordingly, when a drive signal activates a drive touch electrode, electrostatic haptic feedback may be produced at a substantially localized feedback region 954. The feedback region 954 may correspond to the size and/or shape of the drive touch electrode(s) which have been activated to induce the electrostatic haptic feedback. In some embodiments, additional feedback regions 956, 958 may also be produced by driving additional drive touch electrodes. In some examples, distinct drive signals may drive the additional drive touch electrodes, generating distinct haptic feedback at the additional feedback regions 956, 958.

Figure 10:
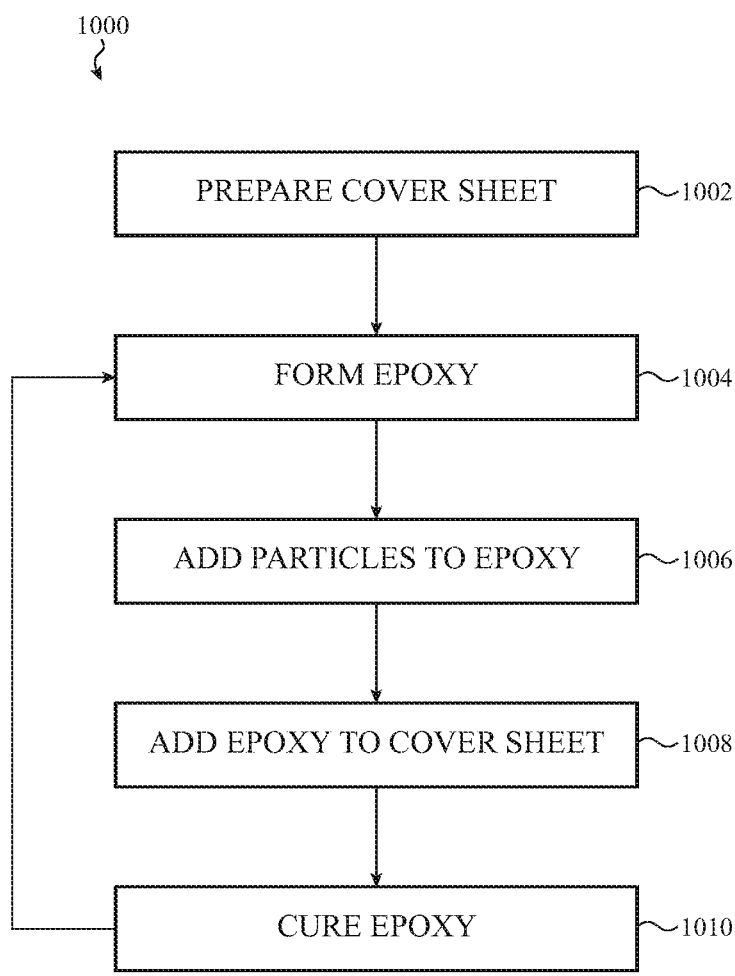
FIG. 10 depicts an example method of forming a cover assembly for an electronic device to provide electrostatic feedback at an input surface.

FIG. 10 depicts an example method of forming a cover assembly for an electronic device to provide electrostatic feedback. The method 1000 of FIG. 10 may be implemented to form a cover assembly of an electronic device, which operates to produce electrostatic haptic feedback, such as described in the examples depicted above with respect to FIGS. 1-9.

The method begins at operation 1002, in which a cover sheet is prepared for forming electrostatic feedback layers, including an electrostatic conductive layer and/or a passivation layer. A cover sheet may be formed in a separate process, and may be formed from a suitable material, such as glass, plastic, sapphire, or combinations thereof. At operation 1002, the cover sheet may be prepared for the addition of an electrostatic conductive layer.

In some embodiments, at operation 1002 the cover sheet may be roughened through a chemical bath or mechanical process, which may introduce imperfections in a surface of the cover sheet to increase bonding between the cover sheet and the electrostatic conductive layer. In some embodiments, at operation 1002 the cover sheet may be treated through a chemical or other process to strengthen the cover sheet. In an example, the cover sheet may be strengthened through an ion exchange, which may place the cover sheet under tension and/or compressive stress.

Next, at operation 1004, an epoxy (e.g., an organic matrix) for the electrostatic conductive layer may be formed. At operation 1006, inorganic particles may be added to the epoxy. Prior to addition into the epoxy, the inorganic particles may be prepared through an appropriate technique. In some examples, inorganic materials may be formed into the inorganic particles through a sol-gel process, through a calcination and pulverization process, or similar techniques.

The inorganic particles may include conductive particles and non-conductive particles, which may be deposited in the epoxy at a sufficient density such that the electrostatic conductive layer may produce electrostatic haptic feedback, but the conductive particles may be sufficiently dispersed such that the electrostatic conductive layer does not interfere with the operation of other components of the electronic device. In some example, the conductive and non-conductive particles may be arranged in patterns, which may be through preparing epoxies at distinct densities and depositing the epoxies in patterns at operation 1008.

In some embodiments, both conductive and non-conductive particles may be added to the epoxy at operation 1006. In other embodiments, the epoxy may be formed with precursors which form the epoxy and inorganic particles in operation 1004. For example, the epoxy may be formed from a mixture of tetramethoxysilane (TMOS), 3-glycidoxypropyl-trimethoxysilane (GPTMS), and titanium-tetraethylate ($Ti(OEt)_4$). After the epoxy and non-conductive particle mixture is formed at operation 1004, conductive particles may be added to the epoxy mixture at operation 1006.

Next, at operation 1008, the epoxy is deposited over the cover sheet. The epoxy may be deposited using an appropriate technique, such as spin coating the cover sheet with the epoxy, spray coating, resin dispensing, and so on. In some examples, more than one epoxy may be formed in operations 1004 and 1006, each epoxy having distinct concentrations of conductive particles. At operation 1008, the different epoxies may be deposited in a pattern, resulting in different concentrations of conductive particles at different portions of the cover sheet.

Finally, at operation 1010 the epoxy may be cured. In some examples, the epoxy may be cured by heating the epoxy to an appropriate temperature, such as 110° C. After curing, the epoxy may form a cross-linked organic matrix with the inorganic particles (including conductive and non-conductive particles) embedded within the matrix.

As depicted in FIG. 10, once the epoxy is cured, the method 1000 may return to operation 1004. One or more additional layers may be formed over the cured epoxy layer. For example, the electrostatic conductive layer may be formed through multiple layers. In some examples, the electrostatic conductive layer may be formed from a first layer with conductive particles at a first concentration and a second layer with conductive particles at a lower second concentration. Additional layers may be included with distinct concentrations of conductive particles.

As another example, a passivation layer may be formed over the electrostatic conductive layer through a similar method. The passivation layer may be formed by forming an epoxy at operation 1004, which may be formed from the same or a different epoxy as the electrostatic conductive layer. At operation 1006, non-conductive organic particles may be added to the epoxy. However, as described above, by using certain precursors at operation 1004 the non-conductive inorganic particles may be formed into the epoxy in one operation, and operation 1006 may be omitted.

At operation 1008, the epoxy may be deposited over the electrostatic conductive layer through an appropriate technique, such as spin coating. The epoxy may be cured at operation 1010, producing a hardened passivation layer with non-conductive inorganic particles embedded within an organic matrix.

One may appreciate that although many embodiments are disclosed above, the operations and steps presented with respect to methods and techniques are meant as exemplary and accordingly are not exhaustive. One may further appreciate that alternate operation order or fewer or additional operations may be required or desired for particular embodiments. For example, operation 1002, preparing the cover sheet, may be omitted in some embodiments, or may occur concurrently with other operations. In another example, the operations of method 1000 may be performed on a large cover sheet, which may afterward be cut into smaller pieces to form cover sheets of electronic devices having an electrostatic conductive layer and a passivation layer.

Figure 11:
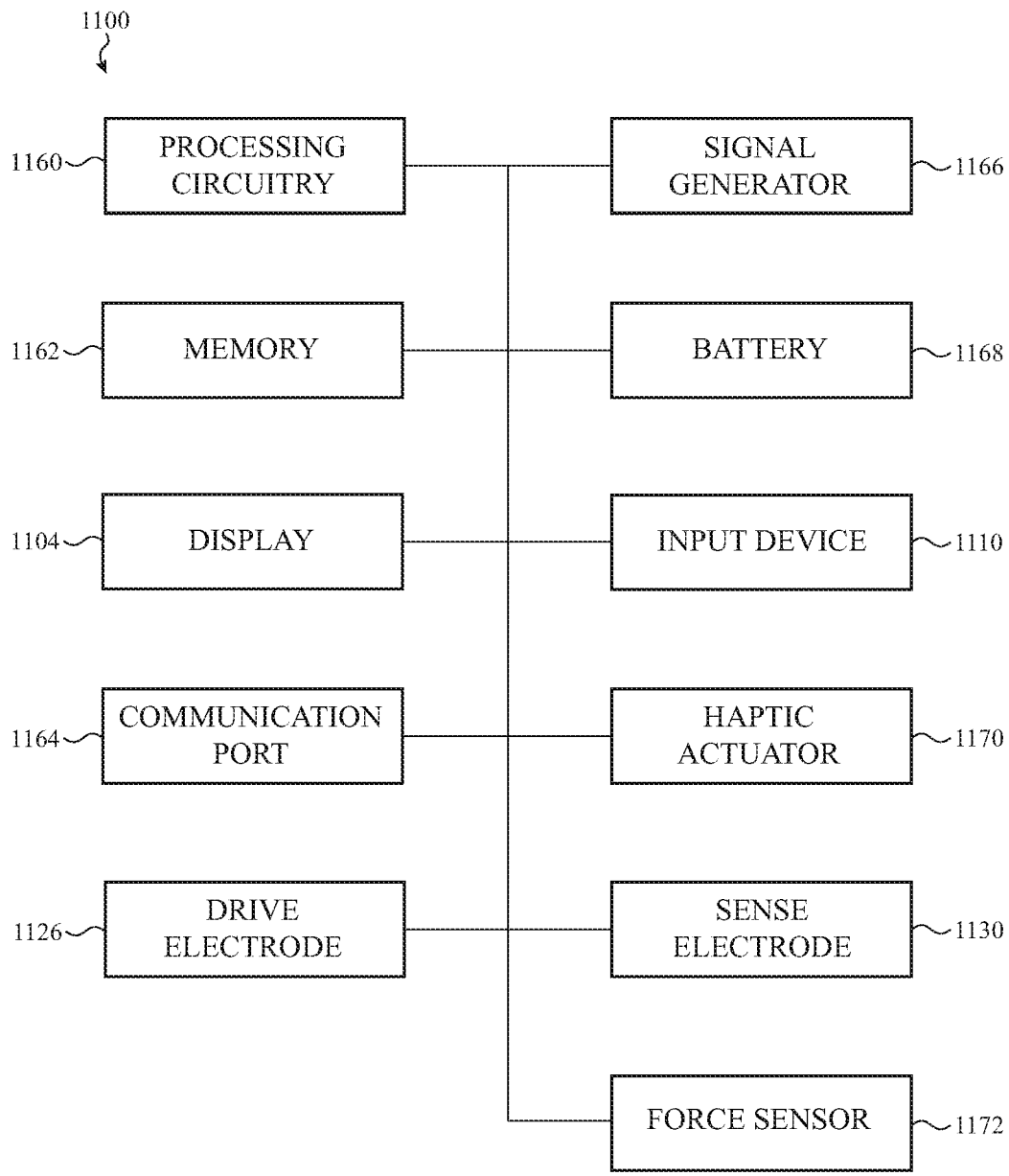
FIG. 11 depicts a schematic view illustrating components of an electronic device according to the present disclosure.

FIG. 11 depicts example components of an electronic device in accordance with the embodiments described herein. The schematic representation depicted in FIG. 11 may correspond to components of the devices depicted in FIGS. 1-10, described above. However, FIG. 11 may also more generally represent other types of electronic devices with a cover assembly which provides electrostatic haptic feedback through a hybrid conductive coating, which may include inorganic conductive and non-conductive particles within an organic matrix.

As shown in FIG. 11, a device 1100 includes a drive electrode 1126 and a sense electrode 1130, which may form a drive touch electrode and sense touch electrode of a touch sensor. The touch sensor may operate using the drive electrode 1126 and the sense electrode 1130 to determine a location of a finger or touch over the input surface of the device 1100. The drive electrode 1126 and the sense electrode 1130 may operate in accordance with a mutual-capacitance or self-capacitance touch sensing scheme.

In addition, the drive electrode 1126 may be driven with a haptic drive signal (e.g., a haptic drive signal received from the signal generator 1166) in order to provide an electrical field to activate a conductive layer and provide electrostatic haptic feedback at an input surface of the device 1100. The haptic drive signal may induce a variable electrostatic charge on the surface, which may produce sensations of higher and/or lower friction to a user operating the electronic device.

The device 1100 may also include a signal generator 1166. The signal generator 1166 may be operatively connected to the drive electrode 1126. The signal generator 1166 may transmit electrical signals to the drive electrode 1126 to control the electrostatic haptic feedback generated at the input surface. The signal generator 1166 is also operatively connected to processing circuitry 1160 and computer memory 1162. The processing circuitry 1160 is configured to control the generation of the electrical signals for the drive electrode 1126.

The memory 1162 can store electronic data that can be used by the signal generator 1166. For example, the memory 1162 can store electrical data or content, such as timing signals, algorithms, and one or more different electrical signal characteristics that the signal generator 1166 can use to produce one or more electrical signals. The electrical signal characteristics include, but are not limited to, an amplitude, a phase, a frequency, and/or a timing of an electrical signal. The processing circuitry 1160 can cause the one or more electrical signal characteristics to be transmitted to the signal generator 1166. In response to the receipt of the electrical signal characteristic(s), the signal generator 1166 can produce an electrical signal that corresponds to the received electrical signal characteristic(s).

The processing circuitry 1160 is operatively connected to components of the device 1100, such as a signal generator and/or the drive electrode 1126. In addition, the processing circuitry 1160 may be operatively connected to the computer memory 1162. The processing circuitry 1160 may be operatively connected to the memory 1162 component via an electronic bus or bridge. The processing circuitry 1160 may include one or more computer processors or microcontrollers that are configured to perform operations in response to computer-readable instructions. The processing circuitry 1160 may include a central processing unit (CPU) of the device 1100. Additionally or alternatively, the processing circuitry 1160 may include other processors within the device 1100 including application specific integrated chips (ASIC) and other microcontroller devices. The processing circuitry 1160 may be configured to perform functionality described in the examples above.

The memory 1162 may include a variety of types of non-transitory computer-readable storage media, including, for example, read access memory (RAM), read-only memory (ROM), erasable programmable memory (e.g., EPROM and EEPROM), or flash memory. The memory 1162 is configured to store computer-readable instructions, sensor values, and other persistent software elements.

In this example, the processing circuitry 1160 is operable to read computer-readable instructions stored on the memory 1162. The computer-readable instructions may adapt the processing circuitry 1160 to perform the operations or functions described above with respect to FIGS. 1-10. The computer-readable instructions may be provided as a computer-program product, software application, or the like.

The device 1100 may also include a battery 1168 that is configured to provide electrical power to the components of the device 1100. The battery 1168 may include one or more power storage cells that are linked together to provide an internal supply of electrical power. The battery 1168 may be operatively coupled to power management circuitry that is configured to provide appropriate voltage and power levels for individual components or groups of components within the device 1100. The battery 1168, via power management circuitry, may be configured to receive power from an external source, such as an alternating current power outlet. The battery 1168 may store received power so that the device 1100 may operate without connection to an external power source for an extended period of time, which may range from several hours to several days.

In some embodiments, the device 1100 also includes a display 1104 that renders visual information generated by the processing circuitry 1160. The display 1104 may include a liquid-crystal display, light-emitting diode, organic light emitting diode display, organic electroluminescent display, electrophoretic ink display, or the like. If the display 1104 is a liquid-crystal display or an electrophoretic ink display, the display may also include a backlight component that can be controlled to provide variable levels of display brightness. If the display 1104 is an organic light-emitting diode or organic electroluminescent type display, the brightness of the display 1104 may be controlled by modifying the electrical signals that are provided to display elements.

In some embodiments, the device 1100 includes one or more input devices 1110. The input device 1110 is a device that is configured to receive user input. The input device 1110 may include, for example, a push button, a touch-activated button, or the like. In some embodiments, the input devices 1110 may provide a dedicated or primary function, including, for example, a power button, volume buttons, home buttons, scroll wheels, and camera buttons. Generally, a touch sensor and a force sensor may also be classified as input components. However, for purposes of this illustrative example, the drive electrode 1126 and sense electrode 1130 of the touch sensor, as well as the force sensor 1172, are depicted as distinct components within the device 1100.

The device 1100 may also include a haptic actuator 1170. The haptic actuator 1170 may provide additional haptic feedback to a user through vibratory or other haptic output. The haptic actuator may be implemented as a linear actuator, an eccentric rotational motor, a piezoelectric transducer, and similar haptic technologies. The haptic actuator 1170 may be controlled by the processing circuitry 1160 and/or the signal generator 1166, and may be configured to provide haptic feedback to a user interacting with the device 1100. In some embodiments, distinct signal generators 1166 may be connected to the drive electrode 1126 and the haptic actuator 1170.

The device 1100 may also include a communication port 1164 that is configured to transmit and/or receive signals or electrical communication from an external or separate device. The communication port 1164 may be configured to couple to an external device via a cable, adaptor, or other type of electrical connector. In some embodiments, the communication port 1164 may be used to couple the device 1100 to a peripheral device or a computer.

The device 1100 also includes a force sensor 1172, which may register the application of force to the input surface of the device 1100. The force sensor 1172 may be a capacitive force sensor, a strain gauge, a piezoelectric force sensor, or another appropriate force-sensing device. In some embodiments, the force sensor 1172 may be a non-binary force sensor, or a force sensor which measures an amount of force with a range of values. In other words, the force sensor may exhibit a non-binary electrical response (e.g., a change in voltage, capacitance, resistance, or other electrical parameter) indicating the amount of force applied to the input surface of the electronic device.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

What is claimed is:

1. An electronic device, comprising: a housing at least partially enclosing an interior volume; and a cover assembly coupled to the housing, the cover assembly comprising:
    an outer layer comprising a first organic matrix formed from a non-conductive and passivating compound and comprising a dispersion of non-conductive particles, the outer layer defining an input surface for receiving a user input to the electronic device;
    an electrically conductive layer below the outer layer, the electrically conductive layer comprising a second organic matrix formed from a non-conductive compound and comprising a dispersion of conductive and non-conductive particles, the electrically conductive layer having a sheet resistance between 1MQ and 100MQ per square;
    a dielectric layer coupled to the electrically conductive layer;
    a touch sensor below the dielectric layer and comprising:
    a first touch electrode conductively decoupled from the electrically conductive layer, the first touch electrode:
        operable in a first mode to receive an electrostatic drive signal to capacitively drive the electrically conductive layer at a frequency between approximately 100 Hz and 500 Hz to a voltage between approximately 100V and 400V; and
        operable in a second mode to capacitively detect a user touch input; an insulating layer; and a second touch electrode; and
    a substrate coupled to the touch sensor and supporting the cover assembly.

2. The electronic device of claim 1, wherein the outer layer and the substrate are optically transparent.

3. The electronic device of claim 2, wherein the cover assembly is positioned over a light emitting display disposed within the housing.

4. The electronic device of claim 1, wherein the touch sensor is a capacitive touch sensor and comprises:
    a first array of touch electrodes, including the first touch electrode; and
    a second array of touch electrodes, including the second touch electrode.

5. The electronic device of claim 4, wherein the first array of touch electrodes is capacitively coupled to the second array of touch electrodes.

6. The electronic device of claim 1, wherein the electrically conductive layer is configured to capacitively couple to a user providing a touch input to outer surface of the housing.

7. The electronic device of claim 6, wherein the electrically conductive layer is configured to capacitively couple the user to the first touch electrode.

8. An electronic device, comprising:
    a housing at least partially enclosing an interior volume;
    a display disposed in the interior volume;
    a touch sensing system disposed below the display within the interior volume;
    a cover assembly positioned over the display and coupled to the housing, the cover assembly comprising:
        a passivation layer defining an input surface to receive a touch input from a user, the passivation layer comprising an epoxy defining an organic matrix in which a plurality of non-conductive particles are dispersed, the non-conductive particles formed from a non-conductive and optically transparent material;

a transparent electrically conductive layer within the interior volume and coupled to the passivation layer, the transparent electrically conductive layer comprising a plurality of non-conductive particles and a plurality of conductive particles dispersed in an epoxy layer the transparent electrically conductive layer having a sheet resistance between 1MΩ and 100MΩ per square;

a first insulating layer within the interior volume and coupled to the transparent electrically conductive layer;

a first touch sensing layer conductively coupled to the touch sensing system and separated from the transparent electrically conductive layer by the first insulating layer, the first touch sensing layer operable in:
  a first mode to receive an electrostatic drive signal to capacitively drive the electrically conductive layer at a frequency between approximately 100 Hz and 500 Hz to a voltage between approximately 100V and 400V; and
  a second mode to capacitively detect a user touch input to the display;

a second insulating layer within the interior volume and coupled to the first touch sensing layer;

a second touch sensing layer conductively coupled to the touch sensing system and separated from the first touch sensing layer by the second insulating layer; and a cover sheet layer disposed over the display and coupled to the second touch sensing layer.

9. The electronic device of claim 8, wherein one of the first insulating layer or the second insulating layer are formed from a piezoelectric material.

10. The electronic device of claim 8, wherein the second touch sensing layer is adhered to the cover sheet layer by an adhesive.

11. The electronic device of claim 10, wherein the adhesive is an optically clear adhesive.

12. The electronic device of claim 11, wherein the adhesive is an epoxy.

13. The electronic device of claim 8, wherein the transparent electrically conductive layer is configured to capacitively couple to the user.

14. The electronic device of claim 8, wherein the first touch sensing layer is capacitively coupled to the second touch sensing layer and is configured to detect a location of the touch input.

15. The electronic device of claim 8, wherein the transparent electrically conductive layer is configured to capacitively couple to the user to provide an electrostatic haptic feedback to the user when the user provides the touch input.

16. The electronic device of claim 15, wherein the electrostatic haptic feedback is provided in response to the touch input.

17. A cover assembly to be positioned over an electronic device display and configured to provide both haptic output and touch input sensing, the cover assembly comprising:
  an epoxy layer comprising:
    an optically transparent outer layer defined by a first dispersion of particles, the first dispersion comprising only non-conductive particles within the epoxy layer; and
    an electrostatic drive layer below the optically transparent outer layer, the electrostatic drive layer defined by a second dispersion of particles, the second dispersion of particles comprising conductive particles and non-conductive particles within the epoxy layer, the electrostatic drive layer having a sheet resistance between 1MΩ and 100MΩ per square;
  a touch sensor below and conductively decoupled from the electrostatic drive layer and comprising:
    a drive electrode capacitively coupled to the electrostatic drive layer and configured to capacitively drive the electrostatic drive layer at a frequency between approximately 100 Hz and 500 Hz to a voltage between approximately 100V and 400V;
    an insulating layer comprising a piezoelectric material; and
    a sense electrode capacitively coupled to the drive electrode and defining therewith a capacitive touch sensor; and
  a rigid and optically transparent substrate adhered to, and positioned below, the touch sensor.

18. The cover assembly of claim 17, wherein the rigid and optically transparent substrate is configured to couple to an outer surface of a display.

19. The cover assembly of claim 17, wherein:
  the electrostatic drive layer is configured to provide electrostatic haptic feedback;
  the piezoelectric material is configured to provide mechanical haptic feedback; and
  the touch sensor is configured to detect a touch input provided by a user to the optically transparent outer layer.

* * * * *